United States Patent [19]

Volk, Jr.

[11] 4,028,552
[45] June 7, 1977

[54] IMAGE COUNTER

[75] Inventor: Joseph A. Volk, Jr., Florissant, Mo.

[73] Assignee: Beta Corporation, Bridgeton, Mo.

[22] Filed: June 11, 1976

[21] Appl. No.: 695,168

Related U.S. Application Data

[62] Division of Ser. No. 524,034, Nov. 15, 1974, abandoned.

[52] U.S. Cl. .............................. 250/570; 353/26 A
[51] Int. Cl.² .......................................... G06K 7/10
[58] Field of Search .......... 250/566, 568, 561, 570; 353/25, 26; 352/92; 235/61.11 E

[56] References Cited

UNITED STATES PATENTS

| | | | |
|---|---|---|---|
| 3,564,209 | 2/1971 | Loughnane | 353/26 |
| 3,700,320 | 10/1972 | Brewer et al. | 235/61.11 E |
| 3,741,645 | 6/1973 | Hollwedel et al. | 353/26 |
| 3,768,897 | 10/1973 | Spani | 353/26 |
| 3,802,771 | 4/1974 | Mickelson | 353/26 |
| 3,809,910 | 5/1974 | Nellis | 250/570 |
| 3,812,532 | 5/1974 | Crosser et al. | 353/26 |
| 3,868,645 | 2/1975 | DelPlanque | 353/25 |
| 3,870,410 | 3/1975 | Abe | 250/561 |

Primary Examiner—David C. Nelms
Attorney, Agent, or Firm—Rogers, Eilers & Howell

[57] ABSTRACT

An image counter and automatic control for same for searching a roll of microfilm or the like having images thereon and for stopping and positioning on a selected image for viewing, printing, or the like. The system generally comprises a film drive for driving the film in the forward and reverse directions, a source of light that impinges on the film as it moves past a given location, the images on the film being detectable by either the passage or impedance of the impinging light rays as compared to the other portions of the film. A plurality of photodetecting means are positioned on the side of the film opposite the light source for producing electrical signals in response to the presence or absence of light detected thereby, and electrical network means are provided for controlling the film drive in response to the signals from the photodetecting means. The electrical network generally comprises means for generating electrical signals corresponding to the count of a selected image to be searched, means for comparing the selected count to an image count representing an initial condition, means for generating an electrical signal in response to this comparison for driving the film in a direction toward the selected image, means for counting the images as they pass the photodetecting means in response to the signals from the photodetecting means, and means responsive to the signals generated by the photodetecting means and the signals corresponding to the count of the image being searched, for controlling the film drive and stopping the film on the selected image.

The system of this invention further comprises a photocell and preamp mounting assembly which generally includes a photocell support means, means for mounting a plurality of photocells to the support means, and a fiber optic associated with each photo and mounted to the support means in fixed relation to the photocell, one end of each fiber optic positioned to receive light from the light source as it passes through the film and to transmit the detected light to the photocell. Means are provided for mounting the photocell support in a selected adjustable vertical position and a selected adjustable horizontal position relative to the length of the film. Also included are filter means for filtering out the infrared radiation from the light source, and means for columnating the light directed to the film. The mounting assembly further includes a circuit board having preamp circuits mounted thereto and means for electrically connecting the preamp circuits to the outputs of the photocells.

18 Claims, 13 Drawing Figures

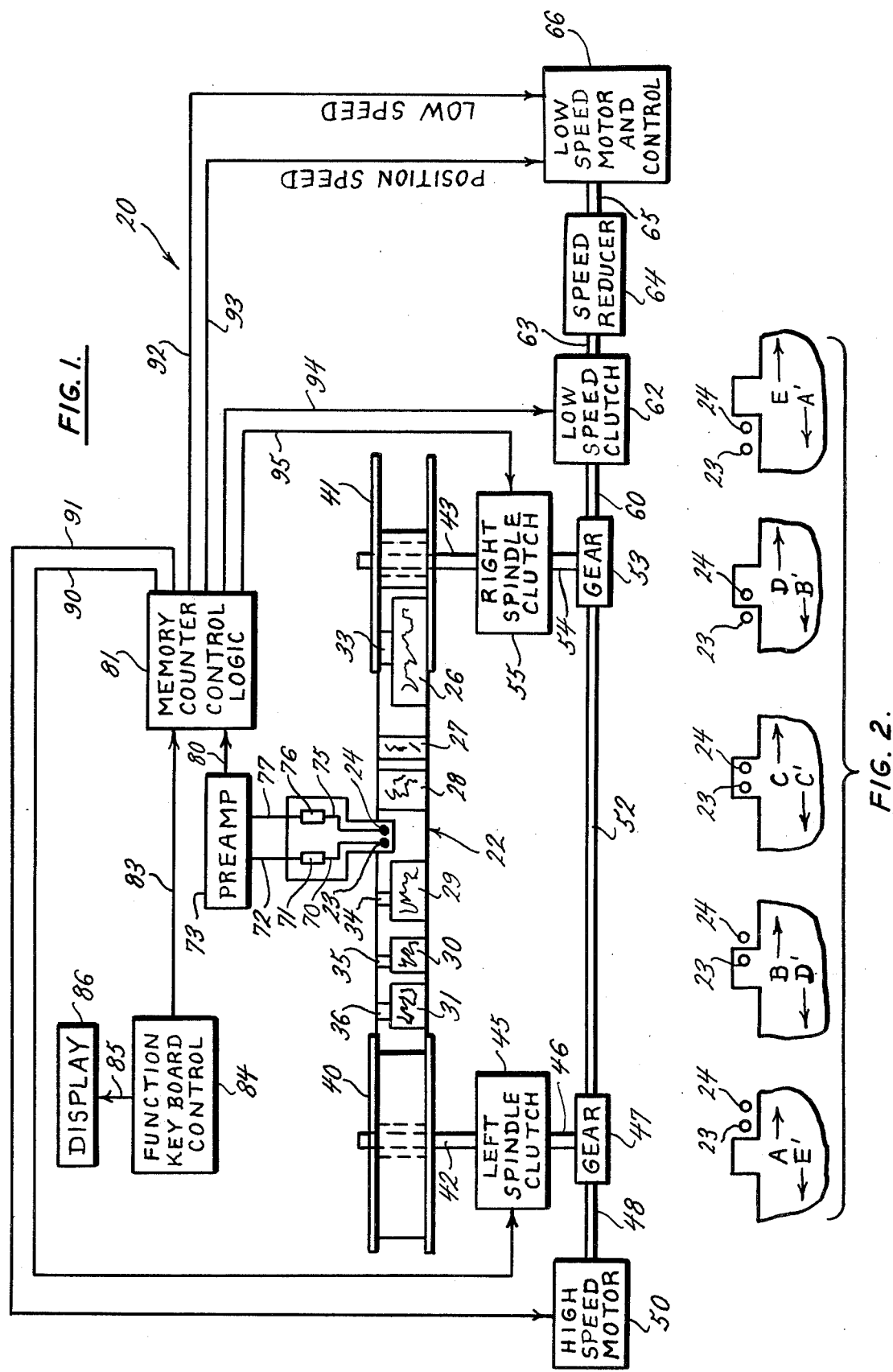

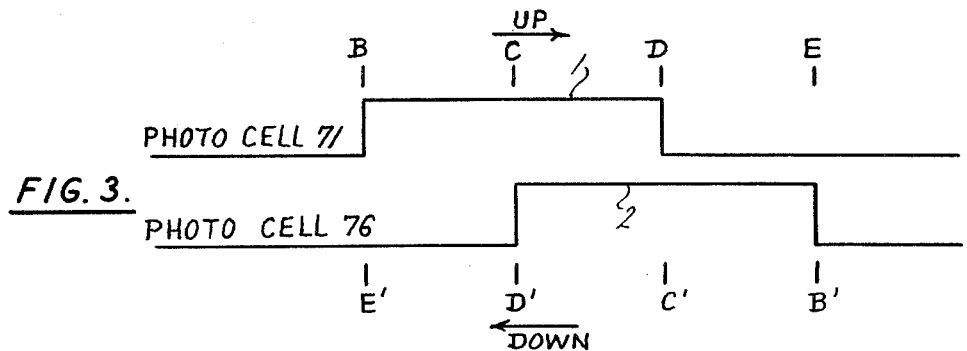
FIG. 3.
| FILM TRAVEL | B | C | D | E |
|---|---|---|---|---|
| UP → | L.E. 1·$\bar{2}$ | L.E. 2·1 | T.E. 1·2 | T.E. 2·$\bar{1}$ |
| | B' | C' | D' | E' |
| ← DOWN | L.E. 2·$\bar{1}$ | L.E. 1·2 | T.E. 2·1 | T.E. 1·$\bar{2}$ |
FIG. 4.
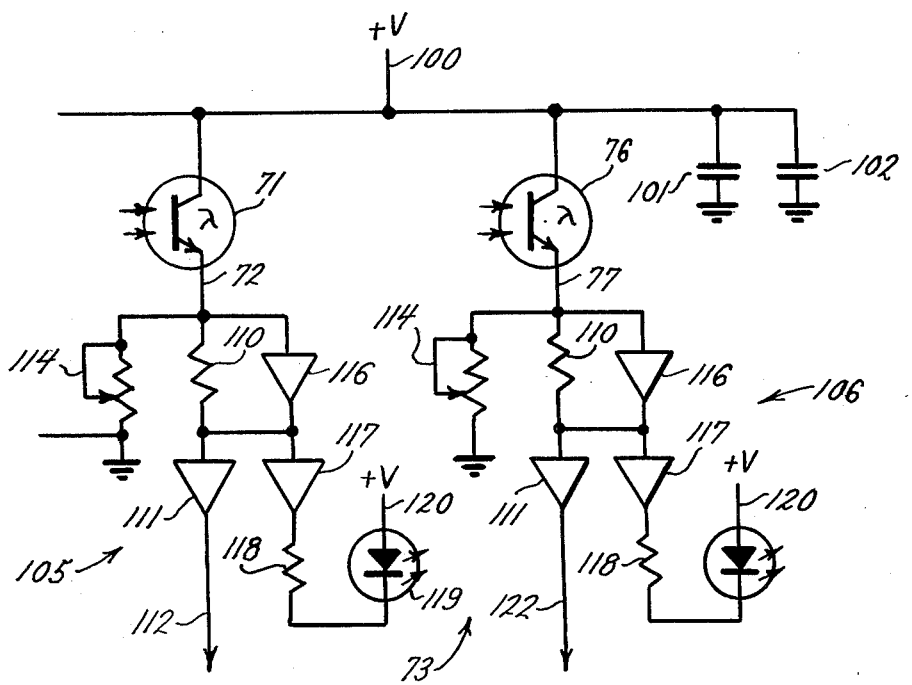
FIG. 5.

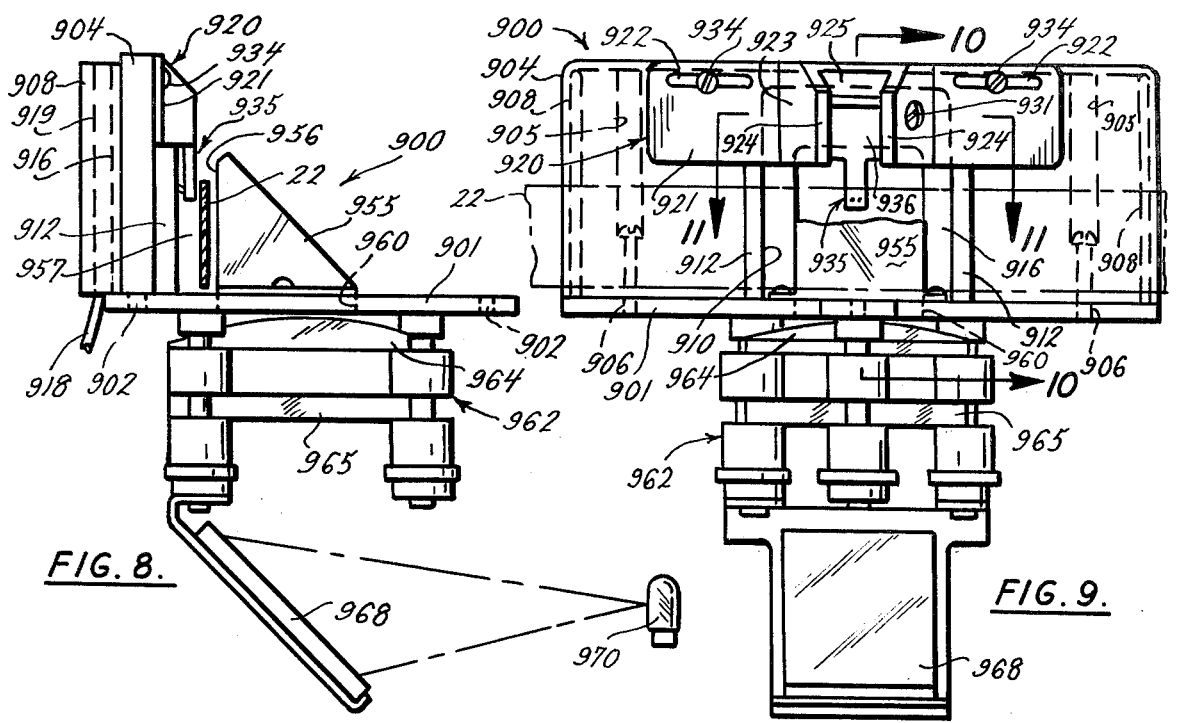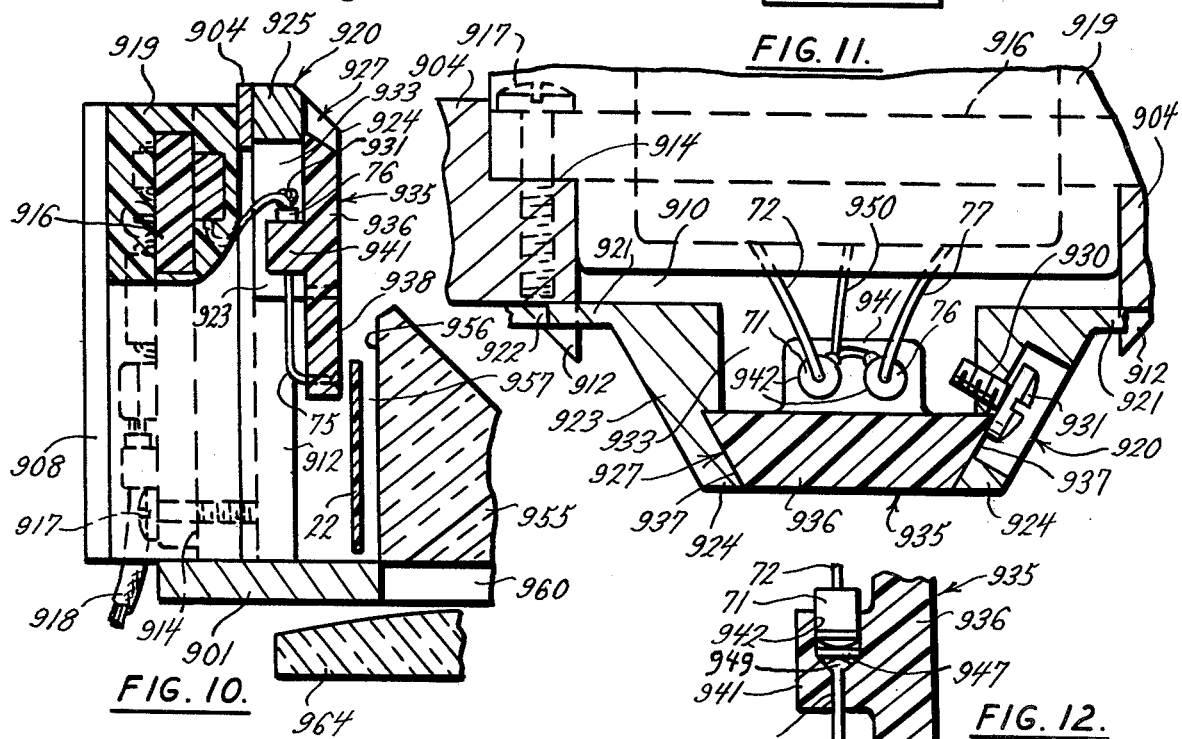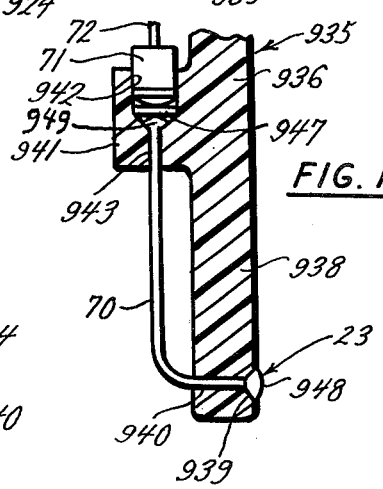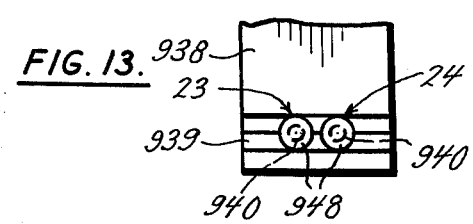

IMAGE COUNTER

This is a division, of application Ser. No. 524,034 filed Nov. 15, 1974 now abandoned.

SUMMARY OF THE INVENTION

This invention generally relates to an image counter and more particularly to a system for searching a roll of film, such as microfilm, having images thereon, and stopping the film on a selected image for viewing, printing, or the like.

So-called microfilm machines in the same general field of this invention customarily include a means for mounting the mircrofilm onto the machine with the film passing through a film gate, and means for driving the film in both the forward and reverse directions. The film may be mounted on a spool and threaded through the film gate onto another spool, or it may be mounted as a cassette, wherein both spools are encased, and the entire cassette is then mounted as a unit to the machine. Such machines also customarily include some sort of projection system, whereby an image on which the film is stopped, is projected by means of mirrors, lenses, and the like onto a viewing screen. Some of these machines also include a printer unit which the operator may actuate to make prints of the selected image.

The system of this invention also includes these basic components, but further comprises a novel automatic control system for selecting a particular image, for causing the sytem to drive the film in a direction toward that image, and for automatically stopping the film on the selected image for viewing, printing, or the like.

The system of this invention makes use of a multiple photocell detection system, and in the preferred embodiment, a two photocell detection system each having a photosensing point associated therewith from which it receives light. The photosensing points of the two photocells are staggered or positioned side by side and spaced a slight distance apart and both on one side of the film as it travels in either the forward or reverse direction. A light source is provided to direct columnated light toward the photosensing points so as to impinge on the other side of the film. The images on the film represent either opaque or transparent areas, with the remainder of the film being just the opposite, so that as the film travels past the sensing points, there is either a presence or absence of light through the film to the sensing points indicating the presence or absence of an image.

Assuming for example that an image means the presence of light, it can further be seen that as the film travels in one direction, one of the photodetection points is illuminated before the other. And as the film travels in the other direction, the sequence of illumination of the photodetection points is reversed. Any time one or both of the photodetection points is illuminated, the light is transmitted to its associated photocell which generates an electrical signal. Thus, the electrical signals from the photocells can be combined in a manner to define the direction that the film is traveling and also count each document as it travels past the photodetection points.

Signals generated by the photocells are fed to a logic network which produces further signals defining the direction of film travel and a count for each document that passes the sensing points, which signals are fed to a counter. Means are provided for loading into the counter a count corresponding to the image on the film from which the system begins its search for a selected image. The count from the counter, which is continually updated as the film images pass the sensing points, is fed to one input of a comparator network. Means are provided for generating signals corresponding to the count of a selected image to be searched, which signals are fed to another input of the comparator network. The comparator network compares the magnitudes of the signals at its inputs and generates a "greater than", "less than," or "identity" signal indicating whether the count of the selected image is greater than, less than, or identical to the preloaded and updated count at the output of the counter. Means are provided for driving the film in one direction toward the selected image when a greater than signal is generated, driving the film in the opposite direction toward the selected image when a less than signal is generated, and positioning on the selected image when an identity signal is generated.

When the film is driven in the appropriate direction to within a selected number of counts from the count of the selected image, means are provided for reducing the rate at which the film is driven from a high speed rate to a low speed rate so that from that point on, the selected image is approached at a lower speed to make it easier to stop the film on the selected image. Once the system has completed the count so that an identity signal is generated, means are provided for automatically driving the film at a position speed, which is at a rate much less than low speed, and finally position on the selected document.

There has been found a tendency for systems of this general type to oscillate once positioned on the selected image. This oscillation is caused by an alternate slackening and tightening of the film as it is positioned on the selected image and by the changes in diameter of the wound film on the take-up and feed spools. Although this oscillation, or alternate slackening and tightening of the film, is very slight, its magnification on a viewing screen produces a noticable and irritating flicker. The system of this invention has overcome this problem by providing a latching network which automatically locks the film on the selected image once it is first positioned on that image.

Another problem with prior art systems of this general type is that once a selected document has been searched, and the film positioned thereon, it is first necessary to clear the system by pressing a clear key or the like before entering the count of the next image to be searched. This inconvenience has been overcome by the system of this invention by providing means for clearing the system to receive the next-selected image count automatically upon entering the next image count. In this manner a second image can be searched immediately after positioning on a first selected image, and then a third image, a fourth image, and so on without having to press a clear key or the like between the search of each image.

Another problem with such prior art systems is the difficulty in properly locating the light-sensing points which receive the light through the film. The images on different rolls of microfilm may not be the same size, and may or may not include image marks which may be used to detect the image. Therefore, either prior art system will not work on a particular roll of microfilm having documents abnormally sized or located, or the light-sensing points have to be repositioned at great difficulty. Thus, it is desirable to provide means for adjusting the light-sensing points along the height dimension of the images so as to locate the points where the detection of the images as they pass is most easily and accurately achieved. On some film this may be near either the top or bottom of the images, while on others it may be near the center of the images.

It is also desirable to provide adjustability of the sensing points along the width dimensions of the images so as to adjust the location where the film will stop for a given image. This in turn affects the position of the projected image on the viewing screen.

Thus, in accordance with this invention a novel photocell and preamp mounting assembly is provided for adjustability of the light-sensing points relative to the film in both the height and width dimensions of the images.

In accordance with the photocell and preamp mounting assembly of this invention, the photocells are mounted to a small support with each having a fiber optic associated therewith which is located with one of its ends in a position to receive light that passes through the film and its outer end in a position to direct that light to the light sensitive surface of the photocell. The support to which the photocells and fiber optics are mounted, is in turn mounted for adjustable vertical movement to a second support means, which second support means is mounted to a base for selective horizontal adjustment in the width dimension of an image. A preamp network is also mounted to the base and electrically connected to the output of the photocells.

Other novel features of the invention include a unique preamp network with a very high input impedance and which includes means for controlling the hysteresis of the preamps to insure that the cell amplifier outputs are either on or off. Means are also provided for momentarily disengaging the film drive when going from high speed to low speed to substantially reduce the inertia in the system.

Thus, it is a primary object of this invention to provide an image counter system that automatically searches for and positions on a selected image and which does so with simplicity to the operator, accuracy, and reliability.

It is a more specific object of this invention to overcome the problems mentioned above with prior art systems of this type and to do so by providing the features mentioned above.

These and other objects of the invention will become evident from the drawings and detailed description to follow.

DESCRIPTION OF THE DRAWINGS:

FIG. 1 is a general schematic diagram of an image counter of this invention;

FIG. 2 is a view illustrating the positions of an image on a strip of microfilm relative to the photodetection points as the image travels past the photodetection points;

FIG. 3 shows waveforms generated by the photocells as a given image moves past the photodetection points;

FIG. 4 is a chart derived from the waveforms of FIG. 3 and showing the relationships of the two waveforms, which relationships are used for determining the direction of travel of the film and for counting the images thereon;

FIG. 5 is an electrical schematic diagram of the preamp circuits used at the outputs of the photodetectors;

FIG. 8 is a side elevation view of a photocell and preamp mounting assembly of this invention;

FIG. 9 is a front elevation view from the right side of FIG. 8;

FIG. 10 is an enlarged view in section taken generally along the line 10—10 of FIG. 9;

FIG. 11 is an enlarged view in section taken generally along the line 11—11 of FIG. 9;

FIG. 12 is a partial, enlarged view of the photocell mounting support as shown in FIG. 10; and FIG. 13 is a view in section taken generally along the line 13—13 of FIG. 12.

Figure 6:
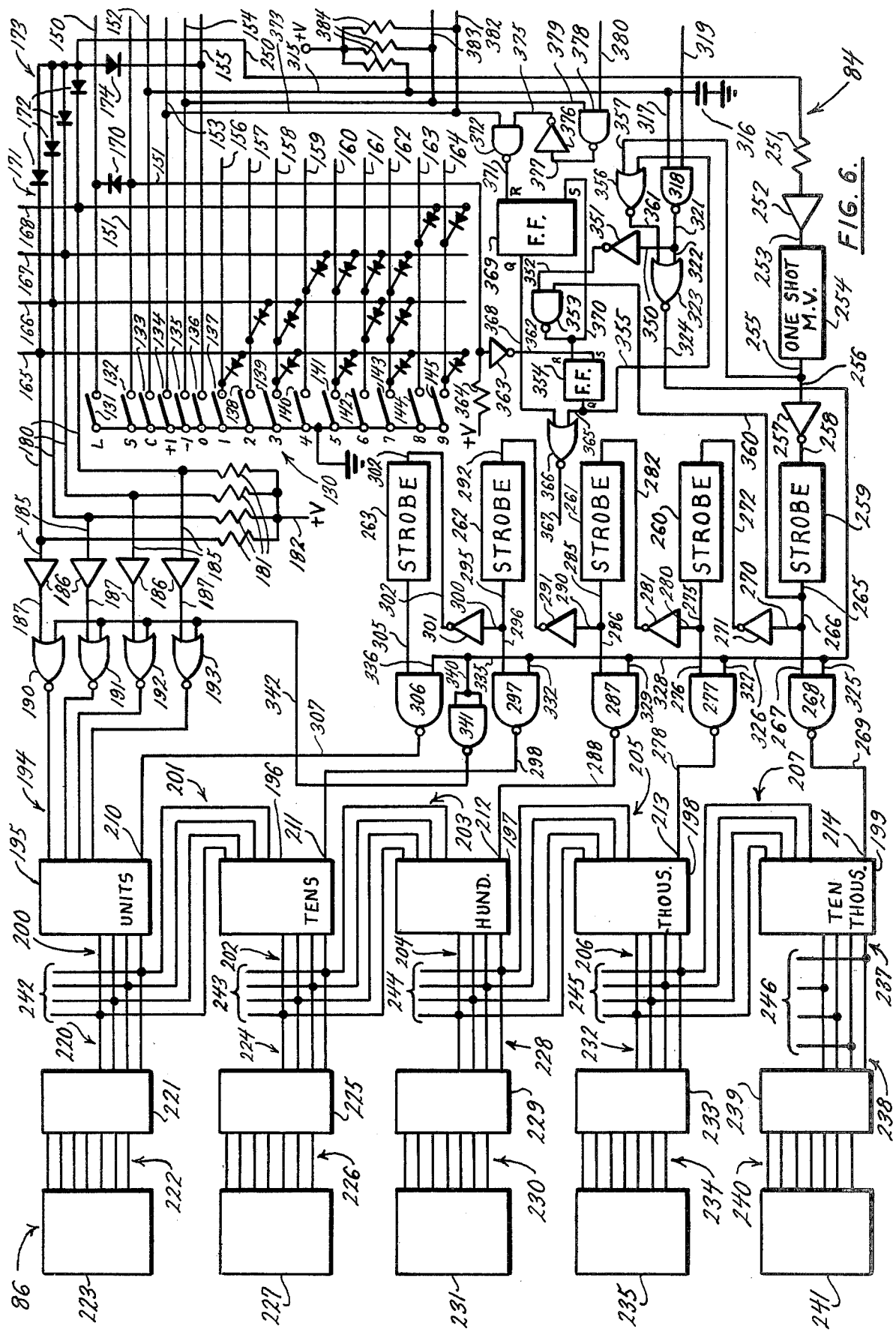
FIG. 6 is an electrical schematic diagram of a function keyboard control and display network of this invention.

DETAILED DESCRIPTION OF A PREFERRED EMBODIMENT:

Before describing the electrical networks of this invention in detail, a general description of the image counter of this invention will be given with reference to FIGS. 1 through 4.

The system 20 of this invention generally comprises a film drive for driving a strip of microfilm 22 past photo pickup points 23 and 24. The film 22 has a series of images such as shown by the numerals 26 through 31 along its length. Some of these images may have image marks such as the marks 33 through 36 shown in FIG. 1. Others, such as images 27 and 28 may have no image marks associated therewith. It will also be noted that the images may vary in width and length. Regardless of the dimensions of the images, or whether there are image marks associated therewith, the system of this invention is capable of counting each image and stopping the film 22 on any selected one.

The film 22 is mounted on spools 40 and 41 which are mounted on drive shafts 42 and 43. For purposes of describing this preferred embodiment of the invention, it is assumed that the numbers or counts to the images increase from right to left as viewed in FIG. 1 so that movement of the film 22 in the "count up" direction means movement of the film to the right as viewed in FIG. 1, and movement of the film in the "count down" direction means movement of the film to the left as viewed in FIG. 1. The shaft 42 is engaged to drive the film 22 in a downward direction when a left spindle clutch 45 is engaged. The clutch 45 is connected through a shaft 46 and a gear 47 to the output shaft 48 of a high speed motor 50. The output shaft 48 of the motor 50 is also connected through the gear 47, a shaft 52, a gear 53, and a shaft 54 to a right spindle clutch 55, which when engaged drives the shaft 43 in a direction to drive the film 22 upwardly. The shafts 46 and 54 are also connected through the gears 47 and 53, the shaft 60, a low speed clutch 62, a shaft 63, and a speed reducer 64 to the output shaft 65 of a low speed motor 66. The purpose of the low speed clutch 62 is to connect the output of the low speed motor 66 to either the drive shaft 42 or 43 as the clutches 45 and 55 dictate. Thus, when the high speed motor 50 is energized, either the drive shaft 42 or shaft 43 will be driven at high speed depending on which of the clutches 45 or 55 is engaged. When the high speed motor 50 is deenergized, the low speed motor 66 is energized, and the low speed clutch 62 is engaged, either the shaft 42 or shaft 43 is driven at low speed depending on which of the clutches 45 or 55 is engaged. In this manner the film may be driven either up or down at either high speed or low speed.

The low speed motor 66 can also be operated at position speed, which is a speed much lower than even low speed and is used for final positioning of the selected image for viewing, printing, or the like.

As the film 22 travels in either direction, it moves past the two photo pickup points 23 and 24 which are arranged and mounted, in a manner to be more fully described, to detect light traveling through the film as the images travel past. The film may be positive or negative and of any of various types including, for example, silver, diazo, and vesicular. As will be seen, the memory counter control logic will accommodate either positive or negative type film.

The detected light from the photo or light pickup point 23 is fed through a fiber optic 70 to the input of a photocell 71, the output of which is connected by a conductor 72 to one input of a preamp network 73. The detected light at the point 24 is fed through a fiber optic 75 to the input of a photocell 76, the output of which is connected by a conductor 77 to another input of the preamp 73. The photocells 71 and 76 are such that when light impinges at their inputs, electrical signals are produced at their outputs which are fed to the preamps 73. Such signals are represented by the waveforms of FIG. 3 as will be explained. These signals are amplified by the preamp 73 and the amplified signals are fed through a conductor cable 80 to an input of a memory counter control logic 81.

The control logic 81 has another input connected by a conductor cable 83 to the output of a function keyboard control 84 which has another output connected by a conductor 85 to a display 86. The control logic 81 has several outputs at which signals are generated to control various components of the film drive system. Thus, the control logic 81 has an output connected by a conductor cable 90 to the control input of the left spindle clutch 45, an output connected by a conductor cable 91 to the control input of the high speed motor 50, an output connected by a conductor cable 92 to one control input of the low speed motor 66, an output connected by a conductor 93 to another control input of the low speed motor 66, an output connected by a conductor 94 to the control input of the low speed clutch 62, and an output connected by a conductor 95 to the control input of the right spindle clutch 55. Thus, a signal on the conductor cable 90 engages the left spindle clutch 45, a signal on the conductor cable 91 energizes the high speed motor 50, a signal on the conductor cable 92 energizes the low speed motor 66 in low speed, a signal on the conductor cable 93 energizes the low speed motor in position speed, a signal on the conductor cable 94 engages the low speed clutch 62, and a signal on the conductor cable 95 engages the right spindle clutch 55.

The purpose of the system of this invention is to allow its operator to search a particular numbered image on the film 22, and to position on the particular image automatically for viewing, printing, or the like. For example, if the operator wishes to view image 650, he properly loads the machine as will be explained, enters this number in the sytem, and presses a search key switch, all of which is accomplished by means of the function keyboard control 84. As the desired image number is entered, the number is displayed on the display 86. The necessary information which includes preloading the system, selecting the image to be searched, and the search command, is fed through the conductor cable 83 to the control logic 81. The purpose of the control logic 81 is to take the information from the function keyboard control 84, and from the preamp 73 and produce output signals at its various outputs to properly control the film drive components to stop the film on the selected image.

Generally, the memory counter control logic 81 compares a count corresponding to the initial position of the film 22 to the count corresponding to the desired image (the image for which the system is to search). Upon receiving a search command, the counter logic 81 generates a greater than, less than, or identity signal depending on whether the selected count is greater than, less than, or equal to the initial count. Upon receiving the search command, and assuming the selected image count is more than a prescribed number away from the initial count, a greater than or less than, signal is generated on the conductor cable 91 to energize the high speed motor 50. The low speed clutch 62 is disengaged. If a greater than signal is generated by the control logic 81, it is fed through the conductor cable 95 to engage the right spindle clutch 55 causing the film 22 to be driven upwardly at high speed. If a less than signal is generated by the control logic 81, that signal is fed through the conductor cable 90 to engage the left spindle clutch 45 so as to cause the film 22 to be driven downwardly at high speed.

As the images, such as 26 through 31 and/or the image marks 33 through 36, of the film 22 move past the photodetection points 23 and 24, signals like those shown by the waveforms of FIG. 3 are fed to the control logic 81 for each document or image mark. From these signals the control logic 81 generates signals corresponding to the direction of travel of the film 22 and representing the count of each image as it moves past the detection points 23 and 24. As the control logic 81 counts the images moving past the points 23 and 24, the count is continually compared with the selected image count. When they compare within a prescribed number, the signal on the conductor cable 91 is removed to deenergize the high speed motor 50, and a signal is generated on the conductor 94 to engage the low speed clutch 62 so as to drive the film 22 at low speed in the same direction until the selected count is reached. In this described embodiment, the low speed position speed motor 66 is engaged at low speed at all times unless placed in position speed.

When the selected count is reached, the control logic 81 generates an identity signal which removes the signal on the conductor cable 92 to the low speed control of the motor 66. It also generates a signal on the conductor cable 93 to place the low speed motor 66 in position speed, and generates appropriate signals on the conductor cables 90 and 95 to engage the left spindle clutch 45 and disengage the right spindle clutch 55 if not previously so engaged. A single is maintained on the conductor cable 94 to keep the low speed clutch 62 engaged. The system then moves at position speed in a downward direction to position on the selected image in a manner to be more fully described.

The manner in which the control logic 81 determines the direction of travel of the film 22 during the search mode, and counts the images on the film as they move past the detection points 23 and 24 will now be explained with reference to FIGS. 2, 3, and 4. FIG. 2 shows the relationship of an image mark such as any of the image marks 33 through 36 to the photodetection points 23 and 24 as the image mark moves past. Although an image with an image mark has been for illustration, this analysis applies equally to images such as the images 27 and 28 without image marks. It will also be assumed that negative film is being used although a similar analysis would apply for positive film. The analysis will first be made with the film moving upwardly and then again with the film moving downwardly.

With the film moving upwardly, the document approaches the points 23 and 24 in position A. At this point the film 22 blocks the light from the photo pickups 23 and 24 and both waveforms are at a "0" level. As the document takes position B, the signal at the output of the photocell 71 transitions to a "1" level as light is fed to its input by means of the fiber optic 70, as shown by the upper waveform of FIG. 3. The output of the photocell 76 remains at a 0 level as shown by the lower waveform of FIG. 3. When the document takes position C, the output of the photocell 76 also goes to a 1 level as light is fed to its input by means of the fiber optic 75, as shown by the lower waveform of FIG. 3. When the document takes position D, the output of the photocell 76 stays at a 1 level, but the output of the photocell 71 drops to a 0 level. When the document takes position E, the output of photocell 71 stays at a 0 level and the output of photocell 76 goes from a 1 level to a 0 level. The same waveforms as shown in FIG. 3 are generated when the image moves in the downward direction from position E to position A.

Thus, the waveforms of FIG. 3 illustrate the relationship between the outputs of the photocells 71 and 76 as an image moves past in the upward direction and in the downward direction. The relationships of these waveforms, and specifically their leading and trailing edges, are shown in the table of FIG. 4.

Referring to FIG. 4, the upper waveform will be designated 1, and the lower waveform 2. With the film traveling in the upward direction, position B of the image mark is defined as the leading edge of 1 and 2 NOT (L.E. $1·\overline{2}$), position C is defined as the leading edge of 2 and 1 (L.E. 2·1), position D is defined as the trailing edge of 1 and 2 (T.E. 1·2), and position E is defined as the trailing edge of 2 and 1 NOT (T.E. $2·\overline{1}$). With the film traveling in the downward direction, position B' is defined as the leading edge of 2 and 1 NOT (L.E. $2·\overline{1}$), position C' is defined as the leading edge of 1 and 2 (L.E. 1·2), position D' is defined as the trailing edge of 2 and 1 (T.E. 2·1), and position E' is defined as the trailing edge of 1 and 2 NOT (T.E. $1·\overline{2}$).

By feeding the waveform signals of FIG. 3 into an appropriate logic network, signals are generated corresponding to selected ones of the relationships shown in FIG. 4 to cause counters in the control logic 81 to count, and to count in either the up or down direction. As will be seen, in this described embodiment, position B in the upward direction and position B' in the downward direction are used to determine the direction of count of the counters in the control logic 81. Position E in the up direction and position E' in the down direction are used to actually count the image. Thus, when an image is moving in the upward direction, signals are generated corresponding to L.E. 1·2 to direct the counters to count up, and signals are generated corresponding to T.E. $2·\overline{1}$ to actually count the image. With the film moving in the downward direction, signals are generated corresponding to L.E. $2·\overline{1}$ to direct the counters to count down, and signals are generated corresponding to T.E. 1·2 to actually count the image.

Although not used in this described embodiment, other of the relationships shown in FIGS. 2 through 4 could be used to define film direction and count the images as the film travels up or down. For example, with the film traveling in the up direction, position C could be used to define its direction, and position D to count the image, and with the film traveling in the down direction, position C' could be used to define direction and position D' to count the image.

With this general background, the components and electrical networks of the system will now be described in greater detail. The preamp circuit 73 is shown in FIG. 5. The collectors of the photocells 71 and 76 are connected through suitable conductors to a source of supply voltage 100. Decoupling capacitors 101 and 102 are connected in parallel to the photocell circuits between the supply voltage 100 and ground. The emitter of the photocell 71 is connected by the conductor 72 to an amplifier circuit 105, and the emitter of the photocell 76 is connected by the conductor 77 to an amplifier circuit 106. The circuits 105 and 106 are identical and therefore only the circuit 105 will be described. A feedback resistor 110 is connected between the emitter of the photocell and the input of an amplifier 111 having an output 112. A variable resistor 114 is connected between the emitter of the photocell and ground. An amplifier 116 is connected across the feedback resistor 110, and another ampifier 117 has its input connected to the output of the amplifier 116, and its output connected through a resistor 118 and a light emitting diode (LED) 119 to a suitable voltage supply 120.

In the operation of each of the preamp circuits 105 and 106, the variable resistor 114 biases the photocell at about half the supply voltage. If the voltage source is 5 volts, the photocell is biased at about 2.5 volts. The feedback resistor 110 across the amplifier 116, controls the hysteresis of the photocell so that the output of the amplifier 116 is either at a 0 volt level or a 5 volt level as the voltage at its input moves up and down between 0 and 5 volts, as occurs when the photocell goes between an off and an on condition. Thus, as the photocell goes from an off condition to an on condition, a voltage somewhat greater than 2.5 volts at the input of the amplifier 116 will be required to cause its output to go from 0 to 5 volts. As the photocell goes from an on condition to an off condition, a voltage at the input of the amplifier 116 of somewhat less than 2.5 volts will be required to cause its output to go from 5 volts to 0 volts. By proper selection of the feedback resistor 110 the hysteresis of the photocell can be controlled so that the output of the amlifier 116 will be either at a 0 level or a 1 level and will not oscillate up and down at the transfer voltage.

The purpose for the variable resistor 114 is to offset any stray light currents that come through the photocell which might raise the output of the circuit 105 or 106 to a 1 level. Thus, it adjusts the level at which the threshold of the logic will operate. The amplifer 117 provides buffering or an isolated drive to the LED lamp 119. The lamp 119 is an indicator that the amplifier is operating and a convenient means for adjusting the preamp. The amplifier 111 provides isolation from the primary amplifier 116 to the control logic network 81. The preamp network 106 is identical to the network 105 except that the output conductor has been designated 122. The signals on the output conductors 112 and 122 of the preamp network 73 are as shown in FIG. 3.

Referring to FIG. 6 there is shown an electrical schematic of the function keyboard control 84 and display 86. The control 84 comprises a decimal-to-binary logic encoding network 130 having a series of switches 131, 132, 133, 134, 135, and 136 through 145. The switch 131 is the load switch, the switch 132 the search switch, the switch 133 the clear switch, the switch 134 the −1 switch, the switch 135 the +1 switch, and the switches 136 through 145 correspond to the decimal numbers 0 through 9, respectively. The wiper arms of these switches are connected together to a common ground. The terminals of the switches 131 through 145 are connected to conductors 150 through 164, respectively. There are also four conductors 165, 166, 167, and 168 representing the 1, 2, 4, and 8 binary weighted numbers, respectively. The conductors 156 through 164 are connected to the conductors 165 through 168 by diodes in the selected manner shown in FIG. 6 such that the depression of any of the switches 137 through 145 representing a particular decimal number, will produce signals on the appropriate ones of the conductors 165 through 168 representing that decimal number in binary form. Thus, for example, it can be seen that if the switch 141 is closed representing the decimal number 5, signals are applied to the conductors 165 and 167 representing and 1 and 4 binary weighted numbers, thus corresponding to the decimal number 5. In this way the selection of any decimal number by closing the appropriate switch produces the corresponding binary related signals on the conductors 165 through 168. The switches 131 through 145 are actuated by an appropriate keyboard or the like (not shown) which is part of the function keyboard control 84.

The conductor 151 is connected to the conductor 150 by a diode 170. Each of the conductors 165 through 168 is connected by a conductor is a set of four conductors 171, and a diode in a set of four diodes 172 to a conductor in a set of four conductors 173. The conductors in the set of conductors 173 are connected together an through a diode 174 to the conductor 155 representing zero.

Each of the conductors 165 through 168 is also connected to a conductor in a set of conductors 180 and a resistor and a set of four resistors 181 to a voltage source 182. Each of the conductors 165 through 168 is also connected by a conductor in the set of conductors 180, a conductor is a set of conductors 185, an amplifier of a set amplifiers 186 and a conductor in a set of conductors 187 to one input of a NOR gate. Thus, one of the conductors in the set of conductors 187 goes to one input of a NOR gate 190, another conductor goes to one input of a NOR gate 191, another conductor to a NOR gate 192, and another conductor to a NOR gate 193. The outputs of the NOR gates 190 through 193 are connected by a set of four conductors 194 to the input of a units buffer register 195. Thus, signals on the set of conductors 194 represent a binary weighted input to the unit's buffer register 195, which binary weighted input corresponds to a decimal number selected by closing an appropriate one of the switches 136 through 145.

In addition to the unit's buffer 195, there is a ten's buffer 196, a hundred's buffer 197, a thousand's buffer 198, and a ten thousand's buffer 199. The output of the unit's buffer is connected by a set of four conductors 200, and a set of four conductors 201 to the input of the ten's buffer 196. The output of the ten's buffer 196 is connected by a set of four conductors 202 and a set of our conductors 203 to the input of the buffer 197. The output of the buffer 197 is connected by a set of four conductors 204 and a set of four conductors 205 to the input of the buffer 198. the output of the buffer 198 is connected by a set of four conductors 206 and a set of four conductors 207 to the input of the buffer 199.

Each of the buffers 195 through 199 has a strobe input. Thus, the buffer 195 has a strobe input 210, the buffer 196 has a strobe input 211, the buffer 197 has a strobe input 212, the buffer 198 has a strobe input 213, and the buffer 199 has a strobe input 214. Each of the buffers 195 through 199 is such that when it receives a strobe signal to its strobe input, it transfers the binary number at its input to its output.

The set of four output conductors 200 from the buffer 195 are also connected to a set of four conductors 220 to the input of a binary-to seven-segment decoder network 221, the output of which is connected by a set of seven conductors 222 to a display device network 223. The set of four conductors 202 at the output of the ten's buffer 196 is also connected to a set of four conductors 224 to the input of a binary-to-seven-segment decoder 225, the output of which is connected by a set of seven conductors 226 to the input of a display device 227. The set of four conductors 204 at the output of the hundred's buffer 197 is also connected through a set of four conductors 228 to the input of a binary-to-seven-segment decoder 229, the output of which is connected through a set of seven conductors 230 to the input of a display device 231. The set of four conductors 206 at the output of the thousand's buffer 198 is also connected through a set of four conductors 232 to the input of a binary-to-seven-segment decoder 233, the output of which is connected through a set of seven conductors 234 to the input of a display device 235. The output of the ten thousand's buffer 199 is connected through a set of conductors 237 and 238 to the input of a binary-to-seven-segment decoder 239, the output of which is connected to a set of seven conductors 240 to the input of a display devie 241. It can be seen that the binary number appearing at the outputs of the buffers 195 through 199, is converted by an appropriate one of the decoders 221, 225, 229, 233, and 239 to produce a display of that number in decimal form on the corresponding ones of the display devices 223, 227, 231, 235, and 241.

It will be seen, that in order to load the machine, or enter the number of the image to be searched, the user enters the number by means of closing the switches 136 through 145. The first digit of the number is entered as the first switch is closed, the second digit as the second switch is closed, the third digit as the third switch is closed, and so on. These decimal numbers will be displayed on the devices 223, 227, 231, 235, and 241, with the last-entered number displayed on the device 223, the second-to-last on the device 227, and so on.

The outputs of the unit's buffer 195 are also connected to a set of four conductors 242, the outputs of the ten's buffer 196 to a set of four conductors 243, the outputs from the hundred's buffer 197 to a set of four conductors 244, the outputs from the thousand's buffer 198 to a set of four conductors 245, and the outputs from the ten thousand's buffer 199 to a set of four conductors 246. It will be seen that the sets of conductors 242 through 246 are connected to a counter comparator network of FIG. 7 as will be described.

The common connection of the conductors 173 is also connected by a conductor 250, a resistor 251, an amplifier 252, and a conductor 253 to the input of a one-shot multivibrator 254. The multivibrator 254 is a network such that when its input goes from a 1 level to a 0 level signal, its output produces a 0 level pulse of a selected width. The output of the multivibrator 254 is connected by a conductor 255 and a conductor 256 to the input of an inverter 257. The output of the inverter 257 is connected by a conductor 258 to the input of a strobe network 259. There are additional strobe networks 260, 261, 262, and 263. Each of the strobe networks 259 through 263 is such that when the input of the network goes from a 1 level to a 0 level, a sharp 0 level pulse is produced at its output. The output of the strobe 259 is fed through a conductor 265, a conductor 266, and a conductor 267 to one input of a NAND gate 268, the output of which is fed through a conductor 269 to the strobe input of the buffer 199. The output of the strobe 259 is also fed through the conductors 265 and 266, a conductor 270, an amplifier 271, and a conductor 272 to the input of the strobe 260. The output of the strobe 260 is fed through a conductor 275 and a conductor 276 to one input of a NAND gate 277, the output of which is fed through a conductor 278 to the strobe input 213 of the buffer 198. The output from the strobe 260 is also fed through the conductor 275, a conductor 280, an amplifier 281, and a conductor 282 to the input of the strobe 261. The output of the strobe 261 is fed through a conductor 285 and a conductor 286 to one input of a NAND gate 287, the output of which is fed through a conductor 288 to the strobe input 212 of the buffer 197. The output from the strobe 261 is also fed through the conductor 285, a conductor 290, an amplifier 291, and a conductor 292 to the input of the strobe 262. The output of the strobe 262 is fed through a conductor 295 and a conductor 296 to one input of a NAND gate 297, the output of which is fed through a conductor 298 to the strobe input 211 of the buffer 196. The output of the strobe 262 is also fed through the conductor 295, a conductor 300, an amplifier 301, and a conductor 302 to the input of the strobe 263. The output of the strobe 263 is fed through a conductor 305 to one input of a NAND gate 306, the output of which is fed through a conductor 307 to the strobe input 210 of the buffer 195.

The conductor 152 connected to the terminal of the clear switch 133 is connected by a conductor 315 and a capacitor 316 to ground, and is also connected to a conductor 317 to one input of a NAND gate 318. The other input of the NAND gate 318 receives a "power on" strobe through a conductor 319 as will be explained. The output of the NAND gate 318 is connected by a conductor 321 and a conductor 322 to one input of a NOR gate 323, the output of which is connected by a conductor 324 and a conductor 325 to the other input of the NAND gate 268. The output of the NOR gate 323 is also connected by the conductor 324, a conductor 326, and a conductor 327 to the other input of the NAND gate 277. It is also connected through a conductor 328 and a conductor 329 to the other input of the NAND gate 287. It is further connected by a conductor 331 and a conductor 332 to the other input of the NAND gate 297, and also by conductors 335 and 336 to the other input of the NAND gate 306. It is also fed through a conductor 340 to both inputs of a NAND gate 341, the output of which is connected by a conductor 342 to the other input of each of the NOR gates 190 through 193.

The output of the NAND gate 318 is also fed through the conductor 321, a conductor 350, an inverter 351, and a conductor 352 to one input of a NAND gate 353, the output of which is connected to the R input of a RS flip-flop 354. The Q output of the flip-flop 354 is connected by a conductor 355 to one input of a NOR gate 356, the other input of which is connected by a conductor 357 to the output of the one-shot multivibrator 254. The NAND gate 353 has another input connected by a conductor 360 to the output of the strobe network 259. The output of the NOR gate 356 is connected by a conductor 361 to the other input of the NOR gate 323.

The flip-flop 354 has an S input connected by a conductor 362 to the output of an inverter 363, the input of which is connected through a resistor 364 to a voltage source, and also to the conductor 151 which is connected to the terminal of the search switch 132.

The flip-flop 354 is such that a 1 level signal at its R input and a 0 level signal at its S input produces a 1 level signal at its Q output, and a 0 level signal at its R input and a 1 level signal at its S input produces a 0 level signal at its output. The Q output of the flip-flop 354 is also fed through a conductor 365 to one input of a NOR gate 366, the output of which is connected to a conductor 367 for purposes to be described. The other input of the NOR gate 366 is connected by a conductor 368 to the Q output of an RS flip-flop 369, the S input of which is connected by a conductor 370 to the S input of the flip-flop 354. The flip-flop 369 has an R input connected by a conductor 371 to the output of a NAND gate 372, one input of which is connected by a conductor 373 to the conductor 153 from the terminal of the +1 swtich 134. The other input of the NAND gate 372 is connected by a conductor 375, an inverter 376, and a conductor 377 to the output of a NAND gate 378, one input of which is connected by a conductor 379 to the conductor 154 from the terminal of the −1 switch 135. The other input of the NAND gate 378 is connected to a conductor 380 for purposes to be described.

Also, the conductor 373, which is connected through the conductor 153 to the terminal of the +1 switch 135, is connected to a conductor 382, and the conductor 379, which is connected to the conductor 154 from the terminal of the −1 switch 135, is connected to a conductor 383 for purposes to be described. The conductors 382, 383, and 315 are each connected through a resistor 384 to a suitable voltage source.

OPERATION OF THE NETWORK OF FIG. 6:

The purpose of the network of FIG. 6 is to allow the user of the system to load an image number into the system, and/or to enter an image number to be searched. For purposes of illustration, suppose that the number 962 is to be loaded into the machine and further suppose that the inputs to the buffers 195 through 199 are 0's. The operator presses the number 9 key which closes the switch 145. This applies 0 level signals to the conductors 165 and 168 thus producing 0 level signals at the outputs of the NOR gates 190 and 193 and a binary coded decimal (BCD) 9 at the input of the unit's buffer 195. Closing the switch 145 also feeds a 0 level signal through the conductor 250, resistor 251, and amplifier 252 to the input of the one-shot multivibrator 254, producing a 0 level pulse at its output and a 1 level pulse at the output of the inverter 257. At the trailing edge of the pulse at the output of the inverter 257, a 0 level strobe pulse is generated at the output of the strobe network 259 which is fed through the NAND gate 268 to the strobe input 214 of the ten thousand's buffer 199 transferring the binary number at its input to its output. This number happens to be 0. The strobe pulse is also fed to the input of the strobe network 260 which then generates a strobe which is fed through the NAND gate 277 to the strobe input 213 of the thousand's buffer 198 transferring the binary number at its input to its output. This number also happens to be 0. The strobe pulse from the strobe network 260 is also fed to the input of the strobe network 261 which then generates a strobe pulse which is fed through the NAND gate 287 to the strobe input 212 of the hundred's buffer 197 transferring the binary number at its input ot its output. This number is also 0. The strobe pulse from the network 261 is also fed to the input of the strobe network 262 which then generates a pulse which is fed to the strobe input 211 of the ten's buffer 196 which transfers the number at its input to its output. This number is 0. The strobe pulse from the network 262 is also fed to the input of the strobe network 263 which generates a strobe pulse at its output which is fed to the strobe input 210 of the unit's buffer 195 which transfers the binary number at its input to its output which is the BCD number 9. The binary 9 is fed through the conductors 220, the decoder 221, and the conductors 222 to appear on the display 223. It is also fed through the conductors 201 to the input of the ten's buffer 196 and is fed through the conductors 242 to the counter comparator network of FIG. 7.

Thus, it can be seen that whenever one of the switches 136 through 145 is closed, a pulse is generated at the output of the one-shot multivibrator 254, at the conclusion of which pulses are sequentially generated at the outputs of the strobe networks 259 through 263. These strobe pulses sequentially gate the numbers at the inputs of the buffers to the outputs starting with the buffer 199 and ending with the buffer 195.

Next, the operator depresses the number 6 key which closes switch 142. This places 0 level signals on the conductors 166 and 167 and a binary 6 at the input of the unit's buffer 195. Closing the switch 142 also produces a pulse at the output of the one-shot multivibrator 254 which in turn causes the sequential generation of strobe pulses at the outputs of networks 259 through 263. The strobe pulse at the output of the strobe network 262 gates the binary 9 from the input to the output of the ten's buffer 196. This binary 9 is fed through the conductors 224 to the converter 225, the output of which is fed through the conductors 226 to display a 9 on the display 227. The binary 9 is also fed through the conductors 203 to the input of the hundred's buffer 197, and through the conductors 243 to the counter comparator network of FIG. 7. Thereafter, the strobe pulse at the output of the strobe network 263 gates the binary 6 from the input to the output of the unit's buffer 195. This binary 6 is fed through the conductors 220 to the input of the decoder 221, the output of which is fed to the display network 223 where a 6 is displayed. The binary 6 is also fed through the conductors 201 to the input of the ten's buffer 196, and through the conductors 242 to the counter comparator network of FIG. 7.

The operator then presses the number 2 key which closes the switch 138. This causes a 0 level signal to appear on the conductor 166 and a binary 2 to appear at the input of the unit's buffer 195. Closing the switch 138, also generates a pulse at the output of the one-shot multivibrator 254 which causes the strobe networks 259 through 263 to fire in sequence. In the same manner as just described with respect to entering the numbers 9 and 6, the binary information at the input of the hundred's buffer 197 is fed to its output such that a 9 appears on the display 231, the binary information at the input of the ten's buffer 196 is transferred to its output so that the number 6 appears on the display 227, and the binary information appearing at the input of the unit's buffer 195 is fed to its output such that a 2 appears on the display 223.

Although the number 962 has been used by way of example, it can be seen that any number up to five digits can be entered, and if more digits are desired, further buffers, decoders, and displays can be added.

Whenever any one of the switches 136 through 145 is closed, and a pulse is generated at the output of the one-shot multivibrator 254, this pulse is also fed to one input of the NOR gate 356. This gate is enabled only when its other input receives a 0 level signal through the conductor 355 from the Q output of the flip-flop 354, and it will be seen that the output of the flip-flop 354 is a 0 level when the search switch 132 or load switch 131 had been just previously closed. Therefore, assuming for now that this is not the case, the output of the flip-flop 354 is at a 1 level and the gate 356 is disabled.

Now suppose that the operator wishes to either load the number 962 into the system, or if another number had been previously loaded, wishes to search for image number 962. If he wishes to load the number into the system, he presses the load button which closes the switch 131. Closing the switch 131 loads the binary numbers on the conductors 242 through 246 into the counter comparator network of FIG. 7 as will be explained. If he wishes to search for image number 962, another number having been previously loaded, he depresses the search button which closes the switch 132. This sends a command signal on the conductor 367 to the network of FIG. 7 causing the system to search for the image as will be further explained.

In either case, whether he closes the load switch 131 or the search switch 132, 0 level signal is produced at the input of the inverter 363, producing a 1 level signal at the S input of the flip-flop 354, and a 0 level signal at its Q output which is fed through the conductor 355 to one input of the NOR gate 356. The 0 level signal at the Q output of the flip-flop 354 is also fed to one input of the NOR gate 366 to produce a search command signal at its output if the other input of the NOR gate 366 is at a 0 level.

After the machine is loaded, or it has completed its search for the selected image, suppose that the operator wishes to enter another document number for the system to search. Suppose, for example, he wishes to search for the image 325. To do this he simply presses the number 3 key which closes the switch 139. This places a binary 3 at the input of the unit's buffer 195 in a manner explained previously and also generates the negative-going pulse at the output of the one-shot multivibrator 254. This negative pulse is fed to the other input of the NOR gate 356. Since the system had just been in either a load or search mode, and therefore the Q output of the flip-flop 354 is at a 0 level, both inputs of the NOR gate 356 are at a 0 level thus enabling the gate and producing a 1 level signal at its output which is fed through the conductor 361 to an input of the NOR gate 323. This 1 level signal produces a 0 level signal at the output of the NOR gate 323 which is fed to one input of each of the NAND gates 268, 277, 287, 297, and 306, and both inputs of the NAND gate 341. A 0 level signal at one input of each of the NAND gates 268, 287, 297, and 306 produces a 1 level signal at each of the outputs which signals are fed to the strobe inputs of the buffers 195 through 199. These 1 level signals at the strobe inputs of the buffers are pulses of the same duration as the pulse at the output of the one-shot multivibrator 254. These pulses at the inputs of the buffers 195 through 199 transfer the binary numbers down the line until they are all cleared. The width of the pulse from the one-shot multivibrator 254 must be of sufficient duration to allow time for all of the buffers to clear.

The 0 signal at the output of the NOR gate 323 produces a 1 level signal at the output of the NAND gate 341 which is fed through the conductor 342 to an input of each of the NOR gates 190 through 193. This places the outputs of each of the NOR gates at a 0 level to place a binary 0 at the input of the unit's buffer 195, and after all of the buffers are cleared, a binary 0 at the input of each of the buffers 195 through 199. Therefore, as soon as the number 3 key is depressed corresponding to the first digit in the next number to be entered after a search or load mode, all of the buffers are automatically cleared to 0. This is accomplished without the need to depress the clear button.

At the completion of the pulse at the output of the multivibrator 254, the NOR gate 356 becomes disabled thus removing the clear strobes at the inputs of the buffers. Additionally, at the trailing edge of the pulse the strobe network 259 generates a negative strobe which then fires the strobe 260 and so on to the strobe 263 which transfers the binary 3 information from the input to the output of the unit's buffer 195 in the manner heretofore explained with respect to entering the number 962. The strobe pulse from the strobe network 259 is also fed through the conductor 360 to one input of the NAND gate 353 thus producing a 1 level pulse at its output which is fed to the R input of the flip-flop 354 to change the signal at the Q output of the flip-flop to a 1 level. The 1 level signal at the output of the flip-flop 354 disables the NOR gate 356 and holds it disabled until the load or search switch is again depressed. Thereafter, the strobes 260 through 263 fire in sequence to gate the binary number 3 at the input of the buffer 195 to its output and display a 3 on the readout 223.

Next, the operator depresses the number 2 key which places a binary 2 in the buffer 195 and a binary 3 in the buffer 196 in the same manner as heretofore described. Again, this is accomplished by the generation of the pulse at the output of the one-shot multivibrator 254. When the number 2 key is depressed, the pulse from the multivibrator 254 is fed through the conductor 357 to the NOR gate 356, but because this gate had been disabled by the 1 level signal at the output of the flip-flop 354, there is no clear pulse generated to clear the buffers.

Next, the operator depresses the number 5 key to place a binary 5 in the unit's buffer 195, a binary 2 in the ten's buffer 196, and a binary 3 in the hundred's buffer 197. He then depresses the search button which closes the switch 132, places a 1 at the S input of the flip-flop 354, and a 0 at its output which enables the NOR gate 356 to automatically clear the buffers when the first digit of the next number is entered.

The buffers 195 through 199 can also be cleared by depressing the clear switch 133. With the switch 133 closed, a 0 level signal is fed through the conductors 315 and 317 to one input of the NAND gate 318, producing a 1 level signal at its output which is fed through the conductors 321 and 322 to one input of the NOR gate 323. This produces a 0 level signal at the output of the NOR gate 323 which operates to clear the buffers 195 through 199 as heretofore described.

The NAND gate 318 also has an input connected to a conductor 319 tht receives a negative pulse whenever the power to the system is turned on as will be described with reference to FIG. 7. This negative pulse produces 1 level signal at the output of the NAND gate 318 and a 0 level signal at the output of the NOR gate 323 to clear the buffers just as where the clear switch is closed. Thus, the buffers are cleared whenever the power is turned on.

The 1 level signal at the output of the NAND gate 318 which occurs between approximately 50 to 100 milliseconds after the power is turned on or whenever the clear switch is closed, is also fed through the conductor 350 to an inverter 351 which produces at its output a 0 level signal which is fed through the conductor 352 to one input of the NAND gate 353. This produces a 1 level signal at the output of the NAND gate 353 which is fed to the R input of the flip-flop 354 placing its output at a 1 level and disabling the NOR gate 356 to insure that a clear pulse is not generated when the first digit of the next number is entered.

Whenever a clear pulse is generated, which is when either the clear switch 133 is closed, the power is turned on, or a first digit is entered after a search or load command, one of the inputs to the NAND gate 353 receives a 0 level signal which produces a 1 level signal at the R input of the flip-flop 354 and a 1 level signal at its Q output. This 1 level output signal is fed through the conductor 365 to one input of the NOR gate 366 producing a 0 level signal at its output. As will be further explained, this 0 level signal at the ouput of the NOR gate 363 disables the film drive clutches so that the film cannot move until the system is once again placed in the load or search mode. This insures that the film cannot move while numbers are being entered into the machine. It further insures that the flip-flop 354 is properly set, and that the clutches become immediately disengaged whenever the clear switch is closed.

The remaining circuit of FIG. 6 is for the purpose of disabling the automatic logic when the +1 and −1 modes are used. These modes are used whenever the operator wishes to move the film in either the up or down direction at position speed by simply depressing the appropriate one of these keys which in turn closes either the switch 134 or the switch 135. In these modes, the film moves at the command of the operator and stops whenever the switch is open. The system does not automatically search for a particular document and position that document on a viewing screen or the like.

When the operator closes the +1 switch 134, a 0 level signal is fed through the conductor 373 to one input of the NAND gate 372 producing a 0 level signal at its output which is fed to the R input of the flip-flop 369. This causes the Q output of the flip-flop 369 to go to a 1 level and the output of the NOR gate 366 to go to a 0 level thus disabling the search command logic to the drive clutches. When the −1 mode switch 135 is closed, a 0 level signal is fed through the conductor 379 to one input of the NAND gate 378 producing a 1 level signal at its output which produces a 0 level signal at the output of the inverter 376. This also produces a 1 level signal at the output of the NAND gate 372, a 1 level signal at the Q output of the flip-flop 369, and a 0 level signal at the output of the NOR gate 366 to disable the search command logic to the drive clutches.

The search command logic will also be disabled when a 0 level signal appears on the conductor 380 at the input of the NAND gate 378 which occurs a short time after the system positions on a selected image as will be described.

The flip-flop 369 is reset with its Q output at a 0 level to enable the NOR gate 366 whenever its S input is at a 1 level and its R input is at a 0 level. This occurs when the switches 134 and 135 are open and a 1 level clear signal is generated at the output of the NAND gate 353.

DESCRIPTION OF FIG. 7

Figure 7:
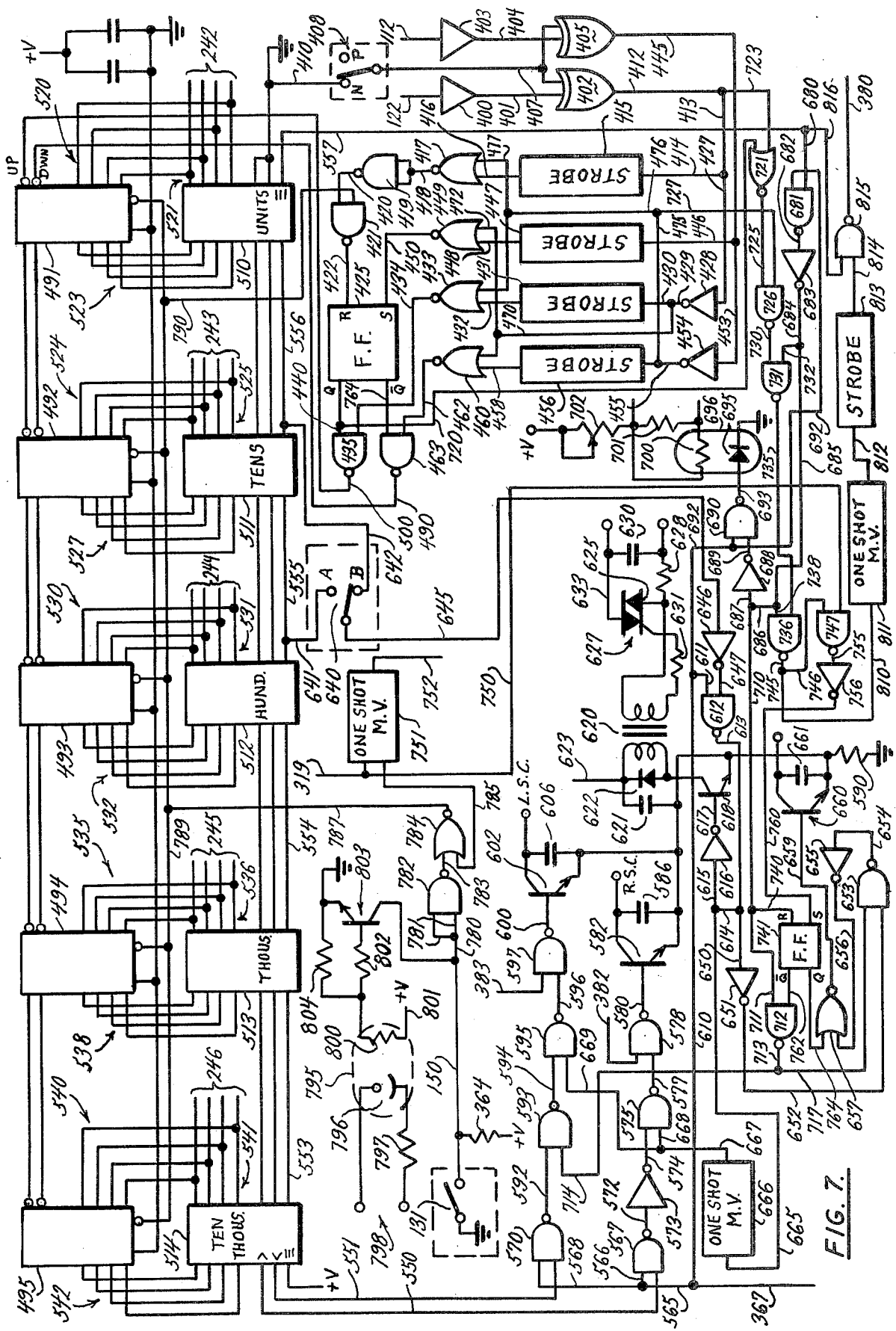
FIG. 7 is an electrical schematic diagram of a memory counter control logic network of this invention.

With reference to FIG. 7 the memory counter control logic 81 will be described.

The signal on the output conductor 122 of the preamp circuit 106 of FIG. 5, as shown by the lower waveform of FIG. 3, is fed through an amplifier 400 and a conductor 401 to one input of an XOR gate 402. The signal on the output conductor 112 of the preamp circuit 105 of FIG. 5, as shown by the upper waveform of FIG. 3, is fed through an amplifier 403 and a conductor 404 to one input of an XOR gate 405. The other inputs of the gates 402 and 405 are connected together and further connected by a conductor 407 to the wiper arm of a switch 408 having a terminal P for positive film and a terminal N for negative film. The negative terminal N is connected by a conductor 410 to ground.

When the switch 408 is in the negative position, one terminal of each of the XOR gates 402 and 405 receives a 0 level signal, and when the switch 408 is in the positive position, these inputs receive a 1 level signal. To be consistent with the waveforms of FIG. 3, it will be assumed for the purposes of this description that the film is negative type and the switch 408 is in the negative position.

When the output of the gate 402 goes from a 1 level to a 0 level, as where the signal on its input conductor 401 goes from a 0 level to a 1 level, the 0 level signal is fed through a conductor 412, a conductor 413, and a conductor 414 to the input of a strobe network 415. When the input of the strobe network 415 goes from a 1 level to a 0 level, a strobe pulse is generated at its ouput which is fed through a conductor 416 to one input of a NOR gate 417. The output of the NOR gate 417 is fed through a conductor 418 to both inputs of a NAND gate 419, the output of which is fed through a conductor 420 to one input of a NAND gate 421. The output of the NAND gate 421 is fed through a conductor 422 to the R (reset) input of an RS flip-flop 425.

The signal from the XOR gate 402 is also fed through the conductor 413, a conductor 427, an inverter 428, a conductor 429, and a conductor 430 to the input of a strobe network 431. Like the network 415, the strobe network 431 produces a strobe pulse at its output when its input goes from a 1 level to a 0 level, which strobe pulse is fed through a conductor 432 to one input of a NOR gate 433, the output of which is fed through a conductor 434 to one input of a NAND gate 435. The NAND gate 435 has another input connected by a conductor 440 to the Q output of the flip-flop 425. Thus, it can be seen that the strobe network 415 generates a strobe pulse at the leading edge of the upper waveform of FIG. 3, and the strobe network 431 generates a strobe pulse at the trailing edge of the upper waveform of FIG. 3.

The output from the XOR gate 405 goes from a 1 level to a 0 level when the signal on its input conductor 404 goes from a 0 level to a 1 level. The output signal from the XOR gate 405 is fed through a conductor 445 and a conductor 446 to the input of a strobe network 447 which is identical to the network 415. The strobe pulse from the strobe network 447 is fed through a conductor 448 to one input of a NOR gate 449, the output of which is fed through a conductor 450 to the S (set) input of the flip-flop 425.

The signal on the conductor 445 at the output of the XOR gate 405 is also fed through a conductor 453, an inverter 454, and a conductor 455 to the input of a strobe network 456 which is identical to the strobe network 415. The strobe output from the network 456 is fed through a conductor 458 to one input of a NOR gate 460, the output of which is fed through a conductor 462 to one input of a NAND gate 463. The NAND gate 463 has another input connected by a conductor 464 to the $\overline{Q}$ output of the flip-flop 425.

Thus, it can be seen that the strobe network 447 generates a strobe pulse at the leading edge of the lower waveform of FIG. 3, and the strobe network 456 generates a strobe pulse at the trailing edge of the lower waveform of FIG. 3.

The output from the inverter 428 is also fed through a conductor 470 and a conductor 472 to an input of each of the NOR gates 449 and 460. Also, the output from the inverter 454 is fed through a conductor 475, a conductor 476, and a conductor 477 to an input of each of the NOR gates 417 and 433.

As previously stated with reference to FIGS. 3 and 4, in this described embodiment of the invention L.E. 1·$\overline{2}$ identifies an "up" direction of film movement, and T.E. 2·$\overline{1}$ is used to count the document with the film moving in the up direction. The condition L.E. 2·$\overline{1}$ is used to identify a "down" direction of film movement, and T.E. 1·$\overline{2}$ is used to count the documents with the film moving in the down direction. Thus, with the portion of FIG. 7 just described, it can be seen that L.E. 1·$\overline{2}$ is represented by the signal on the conductor 450 at the output of the NOR gate 449, L.E. 2·$\overline{1}$ is represented by the signal on the conductor 418 at the output of the NOR gate 417, T.E. 1·$\overline{2}$ is represented by the signal on the conductor 462 at the output of the NOR gate 460, and T.E. 2·$\overline{1}$ is represented by the signal on the conductor 434 at the output of the NOR gate 433. Each of these conditions is represented by a 1 level signal at the output of the respective NOR gate 417, 449, 433, or 460.

The 1 level signal on the conductor 418 becomes a 0 level signal at the output of the NAND gate 419 to apply a 1 level signal at the R input of the flip-flop 425. This produces a 1 level signal at the $\overline{Q}$ output of the flip-flop 425 which is fed to one input of the NAND gate 463. The other input of the NAND gate 463 receives a signal representing T.E. 1·$\overline{2}$. The signal on the conductor 464 remains at a 1 level as long as the flip-flop 425 is set in this condition which is as long as the film is moving in the up direction. The signal on the conductor 462 is a 1 level strobe pulse that is generated at the trailing edge of the lower waveform of FIG. 3. Therefore, with each strobe pulse, a 0 level pulse is generated at the output of the NAND gate 463 which is fed through a conductor 490 to the count down inputs of a set of counters 491 through 495.

When a 1 level signal is generated at the output of the NOR gate 449 representing L.E. $1\cdot\overline{2}$, that signal is fed through the conductor 450 to the S input of the flip-flop 425 causing its outputs to change state so that the Q output goes to a 1 level and the $\overline{Q}$ output goes to a 0 level. The 0 level signal at the $\overline{Q}$ output disables the NAND gate 463, while the 1 level signal at the Q output enables the NAND gate 435. The other input of the NAND gate 435 receives the 1 level pulse signals from the NOR gate 433 corresponding to T.E. $2\cdot\overline{1}$ with the film moving in the upward direction. The signal on the conductor 440 at the input of the NAND gate 435 remains at a 1 level as long as the flip-flop 425 remains in its count up state with the result that 0 level pulses are produced at the output of the NAND gate 435 for each passing document, which pulses are fed through a conductor 500 to the count up inputs to the counters 491 through 495.

To summarize briefly, the counters 491 through 495 are directed to count up or down depending on whether they receive signals on the conductor 490 or the conductor 500, and this depends on the state of the flip-flop 425. Therefore, the flip-flop 425 determines the direction that the counters 491 through 495 count. The condition of the flip-flop 425 is set by the signals at the outputs of the NOR gates 449 and 417 representing L.E. $1\cdot\overline{2}$ and L.E. $2\cdot\overline{1}$, respectively. The generation of these signals depends on which direction the film is moving. Once the direction of count is established by the flip-flop 425, the appropriate one of the NAND gates 435 or 463 is enabled to pass the count pulses from the NOR gate 433 or the NOR gate 460.

In this manner the two photocells 71 and 76 and the waveforms of FIG. 3 produced thereby, provide means whereby the counters 491 through 495 count each image and count in a direction corresponding to the movement of the film.

In this embodiment of the invention there are five counters, the counter 491 representing the unit's digit, the counter 492 representing the ten's digit, the counter 493 representing the hundred's digit, the counter 494 representing the thousand's digit, and the counter 495 representing a ten thousand's digit. There are also five comparator networks 510 through 514 corresponding to the counters 491 through 495, respectively. The counter 491 and the comparator 510 have binary inputs connected by sets of four conductors 520 and 521 to the set of four conductors 242 at the output of the unit's buffer 195 of FIG. 6. The counter 491 has a binary output connected by the set of four conductors 523 to another binary input of the comparator 510. The counter 492 and comparator 511 have inputs connected by sets of four conductors 524 and 525 to the conductors 243 at the output of the ten's buffer 196 of FIG. 6. The counter 492 has a binary output connected by a set of four conductors 527 to another binary input of the comparator 511. The counter 493 and comparator 512 have binary inputs connected by sets of four conductors 530 and 531 to the set of four conductors 244 at the output of the hundred's buffer 197 of FIG. 6. The counter 493 has a binary output connected by a set of four conductors 532 to another binary input of the comparator 512. The counter 494 and comparator 513 have binary inputs connected by sets of four conductors 535 and 536 to the set of four conductors 245 at the output of the thousand's buffer 198 of FIG. 6. The counter 494 has a binary output connected by a set of four conductors 538 to another binary input of the comparator 513. The counter 495 and comparator 514 have binary inputs connected by sets of four conductors 540 and 541 to the set of four conductors 246 at the output of the ten thousand's buffer 199 of FIG. 6. The counter 495 has a binary output connected by a set of four conductors 542 to another binary input of the counter 514.

As the counters 491 through 495 count the pulses corresponding to the images as the film travels, this binary count is fed through the conductors 523, 527, 532, 538, and 542 to one set of inputs of the comparators 510 through 514. The other set of binary inputs to the comparators as well as the binary input to the counters receive from the conductors 242 through 246 signals representing the binary count of the image for which the system is to search, or an image number to be loaded into the machine as will be further explained. The comparator networks 510 through 514 magnitude compare the counts at their inputs and generate a greater than, less than, or identity signal. The comparators have been ganged together to given an overall greater than or less than signal, but not an overall identity signal. The identity outputs of the comparators are connected to give a high speed/low speed control at the output of either the unit's comparator 510 or ten's comparator 511 so as to place the film drive from high speed to low speed when the count gets within ten counts or a hundred counts, respectively, of the image number being searched.

Thus, the comparators 510 through 514 have outputs connected together to produce an overall greater than signal on a conductor 550 whenever the preset number on the sets of conductors 242 through 246 is greater than the count at the output of the counters 491 through 495. The comparators 510 through 514 produce a less than signal on a conductor 551 whenever the preset count on the sets of conductors 242 through 246 is less than the count at the output of the counters 491 through 495. The comparator 514 generates an identity signal on a conductor 553 when the counts at its input conductors 541 and 542 are the same. The comparator 513 generates an identity signal on a conductor 554 whenever the counts at its input conductors 536 and 538 are the same. The comparator 512 generates an identity signal on a conductor 555 whenever the counts at its input conductors 531 and 532 are the same. The comparator 511 generates an identity signal on a conductor 556 whenever the counts at its input conductors 525 and 527 are the same, and the comparator 510 generates an identity signal on a conductor 557 whenever the counts at its input conductors 521 and 523 are the same. The counters 491 through 495 and the comparators 510 through 514 are connected so that the most significant digit is satisfied first. Therefore, the ten thousand's digit is satisfied before the thousand's digit which in turn is satisfied before the hundred's digit and so on. Thus, an identity signal is generated on the conductor 553 before the identity signal on the conductor 554, which is in turn generated before the identity signal on the conductor 555 and so on. When an identity signal is generated on the conductor 557, all of the comparators are in identity and the film has travelled to the selected image.

When a greater than signal is generated on the conductor 550, the film 22 (FIG. 1) must be made to travel in the up direction which means that the right spindle clutch 55 must be engaged and the left spindle clutch 45 must be disengaged. When a less than signal is generated on the conductor 551, the film 22 must be made to move in the down direction which means that the left spindle clutch 45 must be engaged and the right spindle clutch 55 must be disengaged. Also, the high speed motor 50 must be energized, and the low speed clutch 62 must be deenergized, if the photosensor points 23 and 24 are more than a select number of images away from the selected image, so that the system travels at high speed, or approximately 120 inches per second. When the film travels to within either 100 or 10 images of the selected image, which can be selected in a manner to be described, the high speed motor 50 must be deenergized, and the low speed clutch 62 energized to place the film drive in low speed, or approximately 5 inches per second. When an identity signal is achieved, such that the photodetection points 23 and 24 are just to the up side of the selected image, the low speed motor 66 goes into position speed which is a very slow speed, of approximately 0.25 inches per second, the low speed clutch 62 remains energized, the high speed motor 50 remains deenergized, the right spindle clutch 55 is disengaged, and the left spindle clutch 45 is engaged to move the film at position speed downwardly until the back edge of the image or image mark has moved just past the photodetection point 23 to give the relative positioning shown by view C of FIG. 2. At this point the document is properly positioned for either viewing and/or printing and the entire film drive is deenergized. All of this is accomplished in the following manner.

The search command signal, which places the system in the search mode, is generated at the output of the NOR gate 366 of FIG. 6 and is fed through the conductor 367 (lower left side of FIG. 7), a conductor 565 and a conductor 566 to one input of a NAND gate 567, and is also fed through a conductor 568 to one input of another NAND gate 570. The other input of the NAND gate 567 receives the greater than signal from the conductor 550, and the other input of the NAND gate 570 receives the less than signal from the conductor 551. The output of the NAND gate 567 is fed through a conductor 572, an inverter 573, and a conductor 574 to one input of a NAND gate 575. The output of the NAND gate 575 is fed through a conductor 577 to one input of a NAND gate 578, the other input of which receives a signal on the conductor 382 (FIG. 6) which is generated during the +1 mode when the switch 134 is depressed. The output of the NAND gate 578 is fed through a conductor 580 to the base of a transistor 582. A capacitor 586 is connected across the collector and emitter of the transistor 582. The actuating winding (not shown) of the right spindle clutch 55 is connected in series with the collector of the transistor 582, so that when the transistor 582 is turned on, the right spindle clutch 55 is engaged. The emitter of the transistor 582 is connected through a series of conductors and a resistor 590 to ground as shown.

The ouput of the NAND gate 570 is fed through a conductor 592 to one input of a NAND gate 593. The output of the NAND gate 593 is fed through a conductor 594 to one input of a NAND gate 595, the output of which is fed through a conductor 596 to one input of a NAND gate 597. The other input of the NAND gate 597 receives signal from the conductor 383 (FIG. 6) which is present during the −1 mode when the switch 135 is depressed. The output of the NAND gate 597 is fed through a conductor 600 to the base of a transistor 602. A capacitor 606 is connected between the collector and emitter of the transistor 602 and its emitter is connected by a series of conductors through the resistor 590 to ground. A winding (not shown) of the left spindle clutch 45 for actuating and deactuating the clutch is connected in series with the collector of the transistor 602 such that when the transistor 602 is turned on, the left spindle clutch 45 is energized.

It can be seen that either the transistor 582 is turned on to energize the right spindle clutch 55, or the transistor 602 is turned on to energize the left spindle clutch 45 depending on whether a greater than or a less than signal is generated.

The search command signal on the conductor 367 is also fed through a conductor 610 and a conductor 611 to one input of a NAND gate 612. The output of the NAND gate 612 is fed through a conductor 613, a conductor 614, a conductor 615, an inverter 616, and a conductor 617 to the base of a transistor 618. The emitter of the transistor 618 is connected through a series of conductors and the resistor 590 to ground. Its collector is connected to one side of the primary winding of a transformer 620. A capacitor 621 is connected between the other side of the primary winding and the resistor 590. A diode 622 is connected across the primary winding. A conductor 623 connected to the cathode side of the diode 622 carries full wave, 120 v. D.C. rectified power with a frequency of 120 Hz. This 120 Hz. signal at the primary of the transformer is synchronized with the line signal. The secondary winding of the transformer has its top side connected to main terminal 1 625 of a triac switch 627 and also through a resistor 628 to one side of a capacitor 630. The bottom side of the secondary winding of the transformer 620 is connected through a resistor 631 to the gate input of the triac switch 623. Main terminal 2 633 of the triac switch 627 is connected to the other side of the capacitor 630.

When the primary of the transformer 620 is excited, its secondary carries a signal having a frequency of 120 Hz., which signal gates the triac switch 633 between the main terminal 1 625 and the gate, the resistor 631 limiting the current. This causes the triac switch 633 to turn on and allows power to be applied to the winding of the high speed motor 50 to energize that motor. The winding (not shown) of the motor 50 is connected with a start capacitor 630.

Thus, the motor 50 is energized to run whenever the transistor 618 driving the transformer 620 is energized. There is provided instantaneous isolated control of the high speed motor 50 directly from the system logic by means of the triac switch 627 that operates at 120 Hz.

It will be seen that whenever there is a search command on the conductor 367, and the film is more than a selected number of images away from the image being searched, either the left or right spindle clutch 45 or 55 is energized as appropriate, and the high speed motor 50 is energized to move the film at high speed in the appropriate direction.

In accordance with this described embodiment of the invention, the film drive goes from a high speed to a low speed a prescribed number of images before the selected image. The film drive must be slowed sufficiently in advance to kill the inertia in the system and allow the film drive to stop on the selected image. If the images on the film are small, the film drive must be made to go into low speed a greater number of images prior to the selected image than if the images on the film are large. Therefore, there is provided a select switch 640, on terminal A of which is connected through a conductor 641 to the identity conductor 555 from the hundred's comparator 512, and the other terminal B connected by a conductor 642 to the identity conductor 556 of the ten's comparator 511. The signals on the conductors 555 and 556 go from a 0 level to a 1 level when the magnitudes of the numbers at the inputs of the comparators 512 and 511, respectively, become identical. Where the images on the film are small, switch position A is selected, and where the images on the film are large, switch position B is selected.

The wiper arm of the switch 640 is connected by a conductor 645 through an inverter 646 and a conductor 647 to the other input of the NAND gate 612. Thus, when the film is driven to within either 100 images or 10 images of the selected image, depending on the position of the switch 640, a 1 level signal is fed through the conductor 645 to place a 0 level signal at the input 647 of the NAND gate 612 to produce a 1 level signal at its output. This signal becomes a 0 level signal at the base of the transistor 618, turning off the transistor and deenergizing the high speed motor 50. This 1 level signal at the output of the NAND gate 612 is also fed through a conductor 650, an inverter 651, and a conductor 652 to one input of a NAND gate 653 so that the signal on the conductor 652 is a 0 level signal. The output of the gate 653 is connected by a conductor 654 through an inverter 655 and a conductor 656 to one input of a NOR gate 657. The output of the NOR gate 657 is connected by a conductor 659 to the base of a transistor 660. A capacitor 661 is connected between the collector and emitter of the transistor 660 and the emitter is connected through the resistor 590 to ground. An actuating coil (not shown) of the low speed clutch 62 is connected in series with the collector of the transistor 660, so that when the transistor 660 is turned on, the low speed clutch 62 is energized.

It will be seen that the 1 level signal at the output of the NAND gate 612 becomes a 0 level signal at the output of the inverter 651, a 1 level signal at the output of the NAND gate 653, a 0 level signal at the output of the inverter 655, and a 1 level signal at the output of the NOR gate 657, assuming that the other input of the gate 657 is at a 0 level as will be explained. The 1 level signal at the output of the NOR gate 657 turns on the transistor 660 to engage the low speed clutch 62 and place the system in low speed.

It will be noted that the low speed motor 66 is energized all the time as long as the system is on. It becomes engaged with the drive system only when the low speed clutch 62 is engaged, and this occurs only when the high speed motor 50 is deenergized.

The signal at the output of the NAND gate 612 is also fed through the conductors 613 and 614 and a conductor 665 to the input of a one-shot multivibrator 666 which produces at its output a 0 level pulse of a selected width. This pulse might, for example, be approximately 300 milliseconds. The pulse is fed through a conductor 667 and a conductor 668 to another input of the NAND gate 575 and also through a conductor 669 to another input of the NAND gate 595. The 0 level pulse from the one shot multivibrator 666 produces a 1 level pulse at the output of the gate 575. It also produces a 1 level pulse at the output of the NAND gate 595. A 1 level pulse at the output of the NAND gate 575 produces a 0 level pulse at the base of the transistor 582, to turn off the transistor and disengage the right spindle clutch 55 if it be previously engaged. In like manner, the 1 level pulse at the output of the NAND gate 595 produces a 0 level pulse at the base of the transistor 602, turning off the transistor and disengaging the left spindle clutch 45 if it be previously engaged. Whichever of these clutches 45 or 55 were previously engaged, now becomes disengaged for the duration of the pulse at the output of the multivibrator 666. Therefore, the purpose of the multivibrator 666 is to generate a pulse that momentarily disengages the drive clutches 45 and 55 when the system goes from high speed to low speed to substantially reduce the inertia in the system.

It can be seen that when the film is driven to within 100 images or 10 images as selected by the switch 640, of the selected image, the high speed motor 50 is deenergized, the low speed clutch 62 is engaged, and the appropriate one of the left or right spindle clutches 45 or 55 is momentarily disengaged to reduce the inertia in the system and allow it to go into low speed more quickly. The film will continue to be driven at low speed until it comes to the selected image and an identity signal is generated on the conductor 557 from the unit's comparator 510. When this occurs, the selected image is just behind the photodetection points 23 and 24. The system then goes in reverse, or the downward direction, at position speed to finally position on the image as will now be explained.

The identity signal on the conductor 557 from the unit's comparator 510 is fed through a conductor 680 to one input of a NAND gate 681, the output of which is fed through a conductor 682, an inverter 683, a conductor 684, a conductor 685, a conductor 686, a conductor 687, an inverter 688, a conductor 689 to one input of a NAND gate 690. The other output of the gate 690 is connected by a conductor 692 and the conductor 610 to the conductor 367 which receives the search command signal. This same search command signal is also fed from the input of the NAND gate 690 through the conductor 692 to the other input of the NAND gate 681. The output of the NAND gate 690 is fed to the light-emitting diode 695 of a photocoupler 696. Whenever the light-emitting diode 685 is energized by a 1 level signal at the output of the NAND gate 690, a photocell 700 in the coupler 696 is excited and shunts a resistor 701 which is connected across the photocell 700. A variable resistor 702 is connected to one side of the resistor 701 with the other side of the resistor 702 connected to a voltage source. A speed control of the low speed motor 66 is connected across the resistor 701. When this resistor is shunted, the resistance across the motor winding is greatly reduced and the motor drives at position speed.

When an identity signal is generated from the unit's comparator 510, there is no greater than signal on the conductor 550 or less than signal on the conductor 551 so that these signals which engage one of the clutches 45 or 55 are no longer present. However, when the identity signal occurs, the signal on the conductor 686 is also fed through a conductor 710 and a conductor 711 to one input of a NAND gate 712, the output of which is connected by a conductor 713 and a conductor 714 to another input of the NAND gate 593. It is the signal at the input conductor 714 of the NAND gate 593 which is present immediately upon generation of the identity signal, which engages the left spindle clutch 45 causing the film to move downwards at position speed.

The output of the NAND gate 712 is also fed through the conductor 713 and a conductor 717 to another input of the NAND gate 653 to insure that the low speed clutch 62 is engaged. The film is now moving at position in the downward direction.

In accordance with this described embodiment of the invention, the image is to stop and be in the correct viewing position when both photodetection points 23 and 24 are just within the image or image mark, that is, when both are just forward of the rear edge of the image or image mark. This is achieved as follows.

As the film moves in a downward direction at position speed, the second photodetection point 24 will first come within the image or image mark as generally shown in view D of FIG. 2. This will produce a 0 level signal at the output of the flip-flop 425, which signal is fed through a conductor 720 to one input of a NOR gate 721. The other input of the NOR gate 721 is connected by a conductor 723 to the output of the XOR gate 402 which is a 0 level at the number 1 photodetection point 23 is over an image or image mark. This condition, representing a down direction and a photodetection point 23 covered, produces a 1 level signal at the output of the NOR gate 721 which is fed through a conductor 725 to an input of a NAND gate 726. The gate 726 has another input connected by a conductor 727 and the conductor 475 to the output of the inverter 454 which is a 1 level signal whenever the photodetection point 24 is within an image or image mark. Thus, when 1 level signals appear at both inputs of the NAND gate 726 to produce a 0 level signal at its output, the film drive is in a reverse or count down direction, and both photodetection points 23 and 24 are within the image or image mark. These are the conditions where the film is to stop so the image is properly positioned.

The 1 level signal from the output of the NAND gate 726 which is present when these conditions are met, is fed through a conductor 730 to one input of a NAND gate 731. The NAND gate 731 has another input connected by a conductor 732 to the output of the inverter 683. With a 0 level signal at the input conductor 730 to the NAND gate 731, a 1 level signal is generated at its output which is fed through a conductor 735 to one input of a NAND gate 736. The gate 736 has another input connected by a conductor 738 to the output of the inverter 683. The output of the inverter 683 is a 1 level signal whenever there is an identity signal on the conductor 557 from the unit's comparator 510 and a search command on the conductor 367, both of which exist during positioning of the image as now described. This 1 level signal is also fed through the conductors 684, 685, 686, and 710 and a conductor 740 to the R input of a flip-flop 741. The output of the NAND gate 736, which is a 0 level signal when final positioning conditions are met, is fed through a conductor 745 and a conductor 746 to one input of a NAND gate 747. The other input of the NAND 747 is connected by a conductor 750 to the conductor 319 connected to an output from a one-shot multivibrator 751. The input of the multivibrator 751 is connected by a conductor 752, through a suitable power on switch (not shown) to a power source (not shown) for supplying power to the system. When the power on switch is closed to supply power to the system, the multivibrator 751 produces a 0 level pulse at its output 319 which is fed to the NAND gate 747.

When either of the inputs of the NAND gate 747 is 0, a 1 level signal is produced at its output which is fed through a conductor 755 to the input of an inverter 756, the output of which is 0 level signal fed by a conductor 760 to the S input of the flip-flop 741. The flip-flop 741 has a $\overline{Q}$ output connected by a conductor 762 to another input to the NAND gate 712, and a $\overline{Q}$ output connected by a conductor 764 to another input of the NOR gates 657. The flip-flop 741 is such that when the signal at its S input goes to a 0 level, and the signal at its R input to a 1 level, the signal at its Q output goes to a 0 level, and the signal at its $\overline{Q}$ output goes to a 1 level. It will hold these output conditions until the signal at its inputs reverse, at which time the output conditions are reversed.

Therefore, as will be further explained, the 0 level signal at the S input of the flip-flop 741 causes the signal at the $\overline{Q}$ output to go to a 0 level and the signal at the output of the NAND gate 712 to go to a 1 level thereby causing the left spindle clutch 45 to disengage. The 0 level signal at the S input of the flip-flop 741 also causes the signal at its Q output to go to a 1 level. This produces a 0 level signal at the output of the NOR gate 657 which turns off the transistor 660 and disengages the low speed clutch 62. With the left spindle clutch 45 and low speed clutch 62 disengaged, and since the right spindle clutch 55 and high speed motor 50 had been previously disengaged, the film drive comes to a complete stop. The flip-flop 741 is now latched to hold the film drive stopped.

The action of the flip-flop 741 to latch the film drive in the stopped position when the document is properly positioned, is of primary importance. There may be times where oscillation will occur as when the photodetecting point 23 moves on and off the image or image mark. This might occur, for example, where the film slackens after it stops on the selected image and the clutches are disengaged. The slackening of the film may cause the point 23 to move off the image and the logic network to move it back on. The film may again slacken and the point 24 move off the image. This may repeat producing an oscillation and a flicker of the image on the viewing screen. The flip-flop 741 prevents this oscillation and flicker by latching the logic network so that once both points 23 and 24 are within the selected image or image mark, the film comes to a stop and remains stopped even if the film thereafter slackens and the point 23 moves off the image or image mark.

The flip-flop 741 remains in this latching state unless or until a greater than or less than signal is generated on the conductor 550 or 551. When this occurs, the identity signal on the conductor 557 is removed and goes to a 0 level, producing a 1 level signal at the output of the NAND gate 681, a 0 level signal at the output of the inverter 683, and a 0 level signal at the R input of the flip-flop 741. This also places a 1 level signal at the output of the NAND gate 736, a 0 level signal at the output of the NAND gate 747, a 1 level signal at the output of the inverter 756, and a 1 level signal at the S input of the flip-flop 741. Since the inputs to the flip-flops 741 are now each reversed, its output are reversed and the disabling signals are removed allowing the film to drive in the appropriate direction to again achieve an identity condition.

The load switch 131 shown in FIG. 6 is also shown at the center left of FIG. 7. The terminal of the switch 131 is shown connected through the resistor 364 to a suitable source of voltage and through the conductor 150, a conductor 780, and conductors 781 to the inputs of a NAND gate 782, the output of which is connected through a conductor 783 to one input of a NOR gate 784. The other input of the NOR gate is connected by a conductor 785 to another output of the one-shot multivibrator 751 which carries a 1 level pulse whenever the power to this system is turned on. Whenever a 1 level signal is produced at either input of the NOR gate 784, which occurs whenever the power is turned on or whenever the load switch 131 is closed, a 0 level signal is produced at the output of the NOR gate 784 and fed through a conductor 787 to a load line 789 which is connected to the load inputs of each of the counters 491 through 495. This 0 level signal at the load inputs of the counters loads into the counters whatever number appears on their input conductors 520, 524, 530, 535, and 540 and also prevents the counters from counting.

The load line 789 is also connected by a conductor 790 to another input of the NAND gate 421 at the center right of FIG. 7. This 0 level signal produces a 1 level signal at the output of the NAND gate 421 and to the R input of the flip-flop 425 to set the flip-flop 425 in the count down condition. Thus, whenever the load switch 131 is closed, the counters 491 through 495 are loaded with a selected count, are prevented from counting, and the flip-flop 425 is set in the count down condition.

Also referring to the center left of FIG. 7, there is shown a circuit for preventing the counters 491 through 495 from counting when in the print mode and for placing the flip-flop 425 in the count down condition whenever the system is in the print mode and whenever the power is turned on. The print mode would be used on a system for making prints of the displayed image. Such printers commonly use mirrors for photographing the image and the movement of these mirrors may cause light to impinge upon the photodetection points 23 and 24 thus looking to the system like a moving image which could cause a false count. The circuit about to be described prevents such a false count from occurring during the print cycle and also insures that the flip-flop 425 is in the proper state both during the print cycle and when the power to the system is turned on.

A photocoupler 795 has a neon light 796 connected through a resistor 797 to a suitable source of voltage at an input 798 which voltage is produced whenever the system goes into the print cycle. The photocoupler also has a photocell 800 having one side connected to a suitable voltage source 801 and its other side connected through a resistor 802 to the base of a transistor 803. Another resistor 804 has one side connected between the photocoupler 795 and the resistor 802, and its other side connected to the emitter of the transistor 803 which is also connected to ground. The collector of the transistor 803 is connected to the inputs of the NAND gate 782.

Whenever the system goes into a print cycle, the neon light 796 is illuminated and the resistance of the photocoupler 800 is greatly reduced. This biases the transistor 803 on, and produces a 0 level signal at the inputs of the NAND gate 782. A 0 level here produces a 1 level at the output of the NAND gate 782, a 0 level at the output of the NOR gate 784 and on the load line 789 to prevent the counters 491 through 495 from counting. It also sets the flip-flop 425 in the count down state.

Referring to a circuit at the bottom center of FIG. 7, it has been found desirable to disable the search command logic circuitry that controls the film drive an internal of time after positioning of the selected image. The reason for this is to prevent noise pulses from moving the film such as are generated, for example, in the printer of the machine.

The output of the NAND gate 736, which carries a 0 level signal whenever the document is properly positioned, is also connected through a conductor 810 to the input of a oneshot multivibrator 811 which produces a pulse signal at its output which is fed through a conductor 812 to the input of a strobe network 813. At the trailing edge of the pulse from the multivibrator 811, the strobe network 813 generates a 1 level strobe pulse at its output which is fed through a conductor 814 to one input of a NAND gate 815. The other input of the NAND gate 815 is connected by a conductor 816 to the conductor 557 which carries the 1 level identity signal. When both inputs of the NAND gate 815 are at a 1 level, its output is a 0 level signal that is fed through the conductor 380 (FIG. 6) producing a 1 level signal at the output of the NAND gate 378, a 0 level signal at the output of the inverter 376, and a 1 level signal at the output of the NAND gate 372. This sets the flip-flop 369 with a 1 level signal at its Q output which is fed through the conductor 368 to the input of the NOR gate 366. This reduces the search command signal at the output of the NOR gate 366 to a 0 level to disable that portion of the logic network of FIG. 7 that drives the film whenever a greater than or less than signal is generated.

Thus, the circuit at the bottom center of FIG. 7 disables the search command film drive logic at a time delay after the selected image is in final position. This time delay is determined by the width of the pulse form the one-shot multivibrator 811.

Operation

To operate the system of this invention, the power is first turned on. When this occurs, a pulse is produced at the output conductor 319 of the one-shot multivibrator 751 in the center of FIG. 7. This is a 0 level pulse that is fed to one input of the NAND gate 318 (FIG. 6) to clear all the buffer registers 105 through 199 and place 0's at their inputs as heretofore described with reference to the network of FIG. 6. The 1 level signal at the output of the NAND gate 318 becomes a 0 level signal at the output of the inverter 351 and a 1 level signal at the output of the NAND gate 353. This 1 level signal is fed to the R input of the flip-flop 354 to place its Q output at a 1 level thus disabling the search command signal on the conductor 367 at the output of the NOR gate 366 to insure that the film drive remains disengaged and the film is stopped. The same 1 level signal at the R input of the flip-flop 354 is fed through the conductor 370 to the S input of the flip-flop 369 to place its Q output, and an input of the NOR gate 366 at a 0 level. This places the flip-flop 369 in the proper condition to enable the NOR gate 366 when the system is placed in the search mode.

This same 0 level pulse from the multivibrator 751 is fed through the conductor 750 to the input of the NAND gate 747. This places a 0 level signal at the S input of the flip-flop 741 to properly preset the flip-flop. The multivibrator 751 also produces a 1 level pulse at its output conductor 785 which is fed to the input of the NOR gate 784. This produces a 0 level pulse at the output of the NOR gate 784 which is fed through the conductor 787 and the load line 789 to load 0's into each of the counters 491 through 495. This same 0 level pulse is also fed through the conductor 790 to produce a 1 level pulse at the output of the NAND gate 421 to set the direction flip-flop 425 in the count down condition.

Next, the operator, having placed the microfilm in the machine as shown schematically in FIG. 1, notes the number or count of the image nearest the sensing points 23 and 24 on the up side of these points and enters this count by use of a keyboard or the like. This count might be any count on the film depending on where the previous operator stopped the film or on how the machine is loaded. Assume by way of example that this count is 962. The operator first enters the number 9 with the number 9 appearing on the display 223 of FIG. 6. He then enters the number 6 with the number 9 appearing on the display 227 and the number 6 appearing on the display 223, and he finally enters the number 2 with the number 9 appearing on the display 231, the number 6 appearing on the display 227, and the number 2 appearing on the display 223, all as previously described with reference to FIG. 6.

Binary weighted signals representing the number 9 are carried by the conductors 244 to the inputs of the counter 493 and comparator 512. Binary weighted signals representing the number 6 are carried by the conductors 243 to the inputs of the counter 492 and comparator 511, and binary weighted signals representing the number 2 are carried by the conductors 242 to the inputs of the counter 491 and comparator 510.

Next, the operator presses the load key which closes the switch 131. This produces a 0 level signal on the conductor 150 and a 0 level signal on the load line 789 to load the number 962 in the counters 493, 492, and 491. Prior to closing the load switch 131, there was no search command generated and the film drive was disabled. However, when the load switch 131 is closed, this automatically produces a 0 level signal on the conductor 151 through the diode 170 (FIG. 6). This signal becomes a 1 level signal at the output of the inverter 363, and at the S input of the flip-flop 354. This places the Q output of the flip-flop 354 and the other input of the NOR gate 366 at a 0 level.

With both inputs of the NOR gate 366 at a 0 level, a 1 level "search command" signal is generated at its output and is fed through the conductor 367 (FIG. 7), the conductor 610, and the conductor 611 to one input of the NAND gate 612. Since the number 962 was loaded into the counters, the counts at the inputs of each of the comparators 510 through 514 are identical in magnitude, and a 1 level identity signal exists on each of the conductors 553 through 557. This places a 1 signal on the conductor 645, a 0 level signal at the output of the inverter 646 and the other input of the NAND gate 612. This produces a 1 level signal at the output of the NAND gate 612 and a 0 level signal at the output of the inverter 616 to disable the transistor 618 and the high speed motor 50. The 1 level signal at the output of the NAND gate 612 becomes a 0 level signal at the output of the inverter 651, a 1 level signal at the output of the NAND gate 653, and a 0 level signal at the output of the inverter 655 which is fed to one input of the NOR gate 657.

The other input to the NOR gate 657 also goes to a 0 level when the load switch 131 is closed for this reason. After the power on strobe, the signal at the S input of the flip-flop 741 went to a 1 level. Since the signal on the search command conductor 367 was at a 0 level before the load switch was closed, there were 0 level signals on the conductors 610 and 692 and at one input of the NAND gate 681. This produced a 1 level signal at the output of the NAND gate and a 0 level signal at the output of the inverter 683 and at the R input of the flip-flop 741. This placed a 1 level signal at the Q output of the flip-flop 741 and a 0 level signal at the Q output. When the load switch 131 is closed, a 1 level search command signal is fed through the conductor 610 and conductor 692 to one input of the NAND gate 681, the other input of which is also at a 1 level because of the identity condition. This makes the output of the NAND gate 681 a 0 level and the output of the inverter 683 a 1 level thereby changing the signal at the R input to the flip-flop 741 from a 0 level to a 1 level. Now both inputs of the flip-flop 741 are at 1 levels while the signals at its Q and Q outputs remain unchanged. Therefore, after the load switch 131 is closed, the inputs to the NOR gate 657 are 0 level signals and its output a 1 level signal to turn on the transistor 660 and engage the low speed clutch 62.

Since there is a 1 level signal at the R input of the flip-flop 741, there is also a 1 level signal at the input conductor 711 of the NAND gate 712. Also, since there is a 1 level signal at the Q output of the flip-flop 741, the output of the NAND gate 712 is a 0 level signal that is fed through the conductor 714 to produce a 1 level signal at one input of the NAND gate 595. Since its other input is also at a 1 level, except when a 0 level pulse is generated from the multivibrator 666 which only occurs where the system goes from high speed to low speed, a 0 level signal appears at the output of the NAND gate 595 and a 1 level signal at the base of the transistor 602 to turn on the transistor and engage the left spindle clutch 45.

Because both inputs of the NAND gate 681 are at 1 levels, there being both an identity signal and a "search command" signal, its output is a 0 level signal and the output of the inverter 683 is a 1 level signal. This makes the output of the inverter 688 a 0 level signal and the output of the NAND gate 690 a 1 level signal to place the low speed motor 66 in position speed.

Therefore, it can be seen that after the power is turned on and an image number is loaded into the counters, the low speed clutch 62 and left spindle clutch 45 are engaged, and the low speed motor 66 is placed in position speed to move the film in the downward direction at position speed.

As soon as the photodetection points 23 and 24 are covered by the first image or image mark they come to as the film moves in the downward direction, a 0 level signal is generated at the output of the NAND gate 726 representing that both points 23 and 24 are covered by the image or image mark. This produces a 1 level signal at the output of the NAND gate 731 and at one input of the NAND gate 736. The other input of the NAND gate 736 is also at a 1 level since both inputs of the NAND gate 681 are at a 1 level, there being both an identity signal and a search command signal. This produces a 0 level signal at the output of the NAND gate 736, a 1 level signal at the output of the NAND gate 747, and a 0 level signal at the output of the inverter 756. This means that the signal at the S input of the flip-flop 741 goes from a 1 level to a 0 level causing the signal at its $\bar{Q}$ output to go from a 1 level to a 0 level and at its Q output to go from a 0 level to a 1 level. The 0 level signal at the $\bar{Q}$ output produces a 1 level signal at one input of the NAND gate 593 to turn off the transistor 602 and disengage the left spindle clutch 45. The 1 level at the $\bar{Q}$ output produces a 0 level signal at the output of the NOR gate 657 to turn off the transistor 660 and disengage the low speed clutch 62. With these clutches disengaged, the film comes to a stop on that first image, and the number or count of that first image is now loaded into the counters 491 through 495.

Let it be supposed that the operator now wishes to search for document image 325 on the film. Now that the system is properly loaded, the operator first depresses and releases the number 3 key which closes switch 139 (FIG. 6) which automatically clears all of the buffer units 195 through 199 and enters a binary 3 in the buffer unit 195, all as heretofore described. He then presses the number 2 key which closes switch 138 and places a binary 3 in the ten's buffer 196 and a binary 2 in the unit's buffer 195. He then depresses and releases the number 5 key which closes the switch 141 and places a binary 3 in the hundred's buffer 197, a binary 2 in the ten's buffer 196, and a binary 5 in the unit's buffer 195, all in a manner previously explained. These binary signals are fed through the sets of conductors 242, 243, and 244 to one set of inputs to the unit's comparator 510, ten's comparator 511, and hundred's comparator 512. Since the binary signal on the input conductors 532 of the hundred's comparator 512 is a binary 9 while the signals on its input conductors 531 is a binary 3, the comparator 512 representing the most significant digit, a 1 level less than signal is generated on the conductor 551 which signal will remain until the magnitudes of the two binary input signals at each of the buffers 510, 511, and 512 becomes an identity. This less than signal is fed through the conductor 551 to one input of the NAND gate 570.

Now that the operator has selected an image to be searched, he presses the search key which closes switch 132. Closing the search switch 132 generates a 1 level search command signal at the output of the NOR gate 366 (FIG. 6) in the same manner as when the load switch 131 was closed. This 1 level signal is fed through the conductor 367, the conductor 565, and the conductor 568 to the other input of the NAND gate 570. This produces a 0 level signal at the output of the NAND gate 570 which ultimately becomes a 1 level signal at the base of the transistor 602 to turn on the transistor and engage the left spindle clutch 45. The same search command signal is fed through the conductor 610 and conductor 610 and conductor 611 to one input of the NAND gate 612.

We will assume for purposes of this illustration that the switch 640 is in the B position, although, of course, it could be in either position depending on the spacing and size of the images on the film. Since the number of the document being searched is more than 10 counts less than the number loaded into the machine representing the image from which the system started, there is a 0 level signal on the conductor 556, the conductor 642, and the conductor 645, placing a 1 level signal at the output of the inverter 646 and other input of the NAND gate 612. This produces a 0 level signal at the output of the NAND gate 612 and a 1 level signal at the output of the inverter 616 to turn on the transistor 618 and energize the high speed motor 50. With the left spindle 45 engaged and the high speed motor 50 energized, the film moves at high speed in the downward direction.

As the images or image marks move past the photodetection points 23 and 24, the photocells 71 and 76 (FIG. 1) and the preamp networks 105 and 106 (FIG. 5) operate to produce the waveforms of FIG. 3. Also with the switch 408 set in either the positive or negative position, and with the outputs of the preamp circuits 106 and 105 fed through the amplifiers 400 and 403 to the XOR gates 402 and 405, the circuit at the right side of FIG. 7, including, namely, the amplifiers 400 and 403, the XOR gates 402 and 405, the inverters 428 and 454, the strobes 415, 431, 447, and 456, the NOR gates 417, 433, 449, and 460, the NAND gates 419, 421, 435, and 463, and the flip-flop 425, operates in the manner heretofore described to send a count signal either through the conductor 500 or the conductor 490 to the count up or count down inputs of the counters 491 through 495. Since the film in this illustration is moving in the downward direction, the flip-flop 425 is set with its $\bar{Q}$ output at a 1 level to enable the NAND gate 463 and send count pulses through the conductor 490 to the count down inputs to the counters 491 through 495. This causes the counters to count down one count from the loaded count 962 with each document image that passes the photodetection points 23 and 24.

With the switch 640 set in the B position, when the count at the output of the counters 491 through 495 gets to 335, or within 10 of the selected count of 325, a 1 level identity signal is generated on the conductor 556 from the ten's comparator 511. This signal is fed through the conductor 642, the switch 640, and the conductor 645 to the inverter 646, at the output of which is generated a 0 level signal. This 0 level signal produces a 1 level signal at the output of the NAND gate 612 and a 0 level signal at the output of the inverter 616 to turn off the transistor 618 and deenergize the high speed motor 50.

This same 1 level signal at the output of the NAND gate 612 is also fed through the conductors 613, 614, and 665 to the input of the one-shot multivibrator 666 which generates a 0 level pulse which is fed to one input of each of the NAND gates 575 and 595. This produces a 1 level signal at the output of the NAND gate 595 and at one input of the NAND gate 597. Since the other input of the NAND gate 597 is normally at a 1 level, except where the −1 mode is used, its output is at a 0 level and the transistor 602 is momentarily turned off for the width of the pulse at the output of the multivibrator 666. This, in turn, momentarily disengages the left spindle clutch 45 to kill the inertia in the high speed drive. At the end of the pulse, the left spindle clutch 45 becomes again engaged.

The 1 level signal at the output of the NAND gate 612 is also fed through the conductor 613 and 650 to the input of the inverter 651, the output of which is a 0 level signal which is fed through the conductor 652 to one input of the NAND gate 653. This produces a 1 level signal at the output of the NAND gate 653, and a 0 level signal at the output of the inverter 655 and at one input of the NOR gate 657. Since its other input is also at a 0 level as previously explained with respect to the load condition, the output of the NOR gate 657 is a 1 level signal that turns on the transistor 660 and engages the low speed clutch 62.

Therefore, when the count gets to 335, the high speed motor 50 is deenergized, the low speed clutch 62 is engaged, and the left spindle clutch 45 is momentarily disengaged to kill the inertia in the high speed drive. The system now continues in the downward direction in low speed with the counters 491 through 495 continuing to count down toward the selected document count 325.

When the counters reach the count 325, the magnitudes of the counts at each of the comparators 510 through 514 are identities and a 1 level identity signal is generated on the conductor 557. This signal is fed through the conductor 680 to one input of the NAND gate 681. The other input of this gate is at a 1 level since there is a search command signal thereby producing a 0 level signal at its output, a 1 level signal at the output of the inverter 683 and a 1 level signal at one input of the NAND gate 712. The other input of the NAND gate 712 is also at a 1 level since the $\bar{Q}$ output of the flip-flop 741 is at a 1 level as previously explained. This produces a 0 level signal at the output of the NAND gate 712 which is fed through the conductor 714 to one input of the NAND gate 593. This ultimately produces a 1 level signal on the base of the transistor 602 holding the transistor 602 on and holding the left spindle clutch 45 engaged.

It should be noted here that the system had previously been moving in the downward direction. Had it previously been moving in the upward direction, as where the selected image count is greater than the loaded count, the right spindle clutch 55 would have been previously engaged, and the generation of the identity signal on the conductor 557 would have disengaged the right spindle clutch 55 and engaged the left spindle clutch 45. Thus, it can be seen that the system always goes into final position on an image in the downward direction regardless of the direction it had been moving before the identity condition occurred.

The low speed clutch 62 is also held engaged and the low speed motor 66 is placed in position speed during final positioning in the same manner as occurred when the load switch was depressed upon loading the number 962 into the counters as previously explained. The system is now moving at position speed in the downward direction.

As soon as both photodetecting points 23 and 24 are over the next image or image mark the system will stop on that image, which will be image 325, in the same manner that it stopped on the image 962 when the load switch 131 was closed. The flip-flop 741 will be caused to change state and hold the film in the stopped condition.

If it is desired to make a print of the document, a suitable print command at the input 798 of the circuit at the left center of FIG. 7 turns on the transistor 803 producing a 0 level signal at the inputs of the NAND gate 782. This produces a 1 level signal at an input of the NOR gate 784 and a 0 level signal at its output which is fed to the load line 789. As long as the transistor 803 is turned on, which is during the entire print cycle, the 0 level signal on the load line 789 prevents the counters 491 through 495 from counting as might otherwise occur due to mirror movements and the like.

Furthermore, when a stop condition occurs, which is when both photodetecting points 23 and 24 are over the selected image, a 0 level signal is produced at the output of the NAND gate 736 which produces a 0 level pulse at the output of the one-shot multivibrator 811. At the trailing edge of this pulse, a 1 level strobe pulse is generated at the output of the strobe network 813 and fed to one input of the NAND gate 815. When an identity condition occurs, the other input of the NAND gate 815 is also at a 1 level to produce a 0 level pulse at its output which is fed through the conductor 380 to an input of the NAND gate 378 (FIG. 6). The output of this gate is a 1 level pulse producing a 0 level pulse at the output of the inverter 376 and a 1 level signal at the $\bar{Q}$ output of the NAND gate 371. This produces a 1 level signal at the Q output of the flip-flop 369 which places a 0 level signal at the output of the NOR gate 366 to disable the search command signal. With the search command disabled, the NAND gates 567 and 570 of FIG. 7 are disabled to prevent the left spindle clutch 45 or right spindle clutch 55 from engaging as might be caused by the generation of false greater than or less than signals.

The operation of the system has been described by selecting an image count less than the loaded count number. Where the selected image count is greater than the loaded number, the system operates in basically the same manner except that in high speed and low speed search the right spindle clutch 55 is engaged instead of the left spindle clutch 45 so that the transistor 582 is turned on rather than the transistor 602. Also, the direction flip-flop 425 is set to enable the NAND gate 463 to send count pulses through the conductor 490 to the count up inputs of the counters 491 through 495.

The operator may then enter another image number to be searched in which case the system operates as previously described to position on the next selected image. He may also operate in either the +1 or −1 modes.

To operate in the +1 mode the switch 134 is closed placing a 0 level signal at one input of the NAND gate 372 and a 1 level signal at the R input of the flip-flop 369. This produces a 1 level signal at the Q output of the flip-flop and disables the search command so that the search command logic will not operate the left and right spindle clutches. This 0 level signal is also fed through the conductors 373 and 382 to one input of the NAND gate 578 (FIG. 7). This produces a 1 level signal at the output of the NAND gate turning on the transistor 582 and engaging the right spindle clutch 55. This causes the film to move in the up direction as long as the switch 134 is closed.

To operate in the −1 mode the switch 135 is closed placing a 0 level signal at one input of the NAND gate 378 to ultimately disable the search command. This same 0 level signal is fed through the conductor 383 to one input of the NAND gate 597 turning on the transistor 602 and engaging the left spindle clutch 45 causing the film to move in the down direction. The film continues to move in the down direction as long as the switch 135 is closed.

As the film moves up or down in the +1 or −1 modes, the counters 491 through 495 continue to count the images or image marks to hold the place in the count. This means that after using the +1 or −1 mode, the operator can then enter another image number to be searched and close the search switch, and the system will automatically position on the selected image.

In FIGS. 8 through 13 there is shown a mounting assembly 900 for mounting the photocells 71 and 76, fiber optics 70 and 75, and preamp 73 to a suitable microfilm reader unit (not shown). There is included a mounting plate 901 having holes 902 to receive screws or the like for mounting the assembly to the console of a microfilm reader. Above the plate 901, and near its back edge, is mounted a vertical plate 904. The vertical plate 904 has holes 905 for receiving screws which extend into tapped holes 906 in the horizontal plate 901 for mounting the plate 904 to the plate 901.

The vertical plate 904 has ribs 908 which extend rearwardly therefrom and a U-shaped notch 910 at its center which is open at the bottom. The front surface of the vertical plate 904 is generally flat except for vertically-oriented ridges 912 at the sides of the notch 910. The ridges 912 are of generally triangular cross section as shown in FIG. 11, and extend from the bottom of the plate 904 part way toward the top.

A circuit board 916 is mounted to the back side of the plate 904 by means of screws 917 or the like so as to overlie the notch 910. The circuitry of FIG. 5, with the exception of the photocells 71 and 76 and the LED's 119, is secured to the circuit board 916 and is electrically connected to the network of FIG. 7 by means of a conductor cable 918. A suitable potting 919 encloses the circuit board 916 and associated circuitry.

A Horizontal slide assembly 920 includes a vertical plate portion 921 having horizontally oriented slots 922 located near its top and on either side of a forwardly projecting portion 923. The projecting portion 923 has channel members 924 which are oriented vertically and extend forwardly from a thickened portion 925 of the plate 921, the thickened portion 925 being located at the center of the plate. The channel members 924 extend toward each other at an inclined angle and form a channel 927 which is shaped as shown in FIG. 9 and may be described as being generally U-shaped with the sides of the U tapered inwardly toward each other. A tapped hole 930 extends through one of the channel members 924 and receives a set screw 931. At the base of the channel 927 in the thickened portion 925 is a U-shaped opening 933 which opens at the bottom edge of the bracket 920 midway between its end.

The horizontal slide assembly 920 is mounted to the front side of the plate 904 by means of set screws 934 with the lower edge of the assembly 920 resting on the tops of the vertical ribs 912. Thus, by loosening the set screws 934, the entire slide assembly 920 can be made to slide in a horizontal direction a distance permitted by the lengths of the slots 922.

A photocell assembly 935 is secured within the channel 927 by means of the set screw 931. The photocell assembly 935 includes a front portion 936 having tapered sides 937 and which is sized and shaped to slide within the channel 927. A narrowed portion 938 extends downwardly from the front portion 936 and has a V-shaped groove 939 across the bottom. Holes 940 extend through the portion 938 near its bottom and open into the groove 939. In this described embodiment of the invention the holes 940 are located side by side.

Photocell assembly 935 includes another portion 941 which extends rearwardly from the front portion 936 and includes two sets of holes 942 and 943, located side by side. In each set of holes, the hole 942 is in axial alignment with, and is somewhat larger than, the hole 943. Within one hole 942 is mounted the photocell 71 and within the other hole 943 is mounted the photocell 76. A filter element 947 is mounted in front of the light sensitive surface of each of the photocells 71 and 76, which filter element is designed to filter out the infrared radiation from the light source to be further described.

The fiber optic 70 contacts the filter 947 of the photocell 71 at one end and extends downwardly through a hole 943 and frontwardly, with a bend of approximately 90°, through one of the holes 940. The other fiber optic 75 has one end in contact with the filter 947 of the photocell 76 and extends downwardly through the hole 943 and forwardly, with a bend of approximately 90°, through the other of the holes 940. The lower and upper ends of the fiber optics 70 and 74 are melted to form lenses 948 and 949, the lenses 948 defining the photosensing points 23 and 24. The purpose for the fiber optics 70 and 75 is to transmit light received at their lower ends, corresponding to the photosensing points 23 and 24, up to the light sensitive surfaces of the photocells 71 and 76.

The photocell assembly 935 is mounted to the slide assembly 920 with the front portion 936 slideably retained within the channel 927 and the portion 941 extending into the opening 933. It is held in a selected fixed vertical position by means of the set screw 931 as best shown in FIG. 11. The outputs from the photocells 71 and 76 are connected by the conductors 72 and 77, corresponding to those of FIG. 5, to the inputs of the preamp circuits 105 and 106. A common supply connection is made between the photocells 71 and 76 and the preamp circuit by means of a conductor 950. The lengths of the conductors 72, 77 and 950 should be sufficient to allow both vertical adjustability of the photocell assembly 935 within the channel 927, and horizontal adjustability of the slide assembly 920 relative to the plate 904 to which the circuit board 916 is mounted.

A mirror 955 is mounted on top of the plate 901 with its rear surface 956 spaced forwardly from the rear surface of the photocell assembly 935 to provide a film gate 957 through which the film 22 extends, the film 22 being of the type previously mentioned having images such as the images 26 through 31 of FIG. 1 thereon, and being driven as previously described for movement within the film gate from either right to left or left to right as viewed in FIG. 9.

The bottom plate 901 has an opening 960 which underlies the bottom surface of the mirror 955. A mounting bracket 962 is mounted to depend downwardly from the plate 901 and supports a condenser 964 directly beneath the opening 960 and a filter element 965 directly beneath the condenser 964. The bracket 962 also supports a mirror 968 inclined downwardly at approximately 45 degrees as shown to receive noncolumnated lgith from a light source 970 and direct it upwardly through the filter 965 to the condenser 964.

The filter 965 is selected to filter out the infrared radiation from the light source 970 and acts with the filter elements 947 to filter out nearly all such infrared radiation.

Operation of the Assembly of Figs. 8 through 13:

To operate the photocell mounting assembly 900, the photocell assembly 935 is vertically adjusted within the channel 927 and set in a selected location by means of the set screw 931. It is preferred that the channel 427 and slot 433 be of sufficient length so the photocell assembly 935 is adjustable vertically a distance equal to at least half the height of the film 22. The vertical position of the photocell assembly 935 depends on the sizes of images on the film 22 and whether or not there are image marks, such as the makrs 33 through 36 of FIG. 1 for use in counting and positioning the images.

Next, the slide assembly 920 is adjusted horizontally and set in a selected horizontal position by means of the set screws 934 so as to adjust the positioning of the viewed image. It is preferred that the slide assembly 920 be adjustable horizontally at least approximately three centimeters to accommodate the images on most film of this type. By adjusting the photocell assembly 935 vertically and the slide assembly 920 horizontally, which also adjusts the photocell assembly 935 horizontally, the photosensing points 23 and 24 can be moved both vertically and horizontally relative to the film 22. This represents a primary feature of this invention as it provides ready adjustment to accommodate films having different sizes and types of images thereon, and for proper alignment of a selected image on a viewing screen.

With these adjustments made, light from the light source 970 strikes the mirror 968 and is directed upwardly through the filter 965 to the lens 964. The filter 965 filters out most of the infrared radiation from the light source 970. The condenser 964 columnates the light and directs columnated light upwardly to the mirror 955 which redirects it at 90° to the film 22. Whenever a light transmitting portion of the film passes over the photosensing points 23 and 24, which are the lower ends of the fiber optics 70 and 75, the columnated light passes through the film 22 and impinges on the lower end of either or both of the fiber optics 70 and 75. The fiber optics carry the light to their upper ends where it passes through the filters 947 and to the photocells 71 and/or 76. The filters 947 filter out most of the remainder of the infrared radiation that passes through the filter 965.

The impingement of light on either or both of the photocells 71 and 76 produces electrical signals at either or both of their outputs which are fed through the conductors 72 and/or 77 and 950 to the preamp circuits 105 and 106 on the circuit board 916. The preamp circuits 105 and 106 then produce output signals which are fed to the network of FIG. 7 and used in a manner heretofore described for automatically stopping and positioning the film on a selected image.

It will be noted that while the electrical conductors 72, 77, and 950 must flex as the vertical and horizontal adjustments of the photocell mounting 935 are made, there is no flexing of the fiber optics 70 and 75 and no relative change in position of the photocells 71 and 76 and the lower ends of the fiber optics 70 and 75.

Thus, it can be seen that the assembly 900 of FIGS. 8 through 13 combines with the networks of FIGS. 1 and 5 through 7 to provide a very versatile image counter that automatically stops and positions on a selected image without the need for special image codes or the like, and although there may be substantial variations in the sizes and locations of images on the film, all of which is accomplished with great accuracy and reliability.

Various changes and modifications may be made in this invention, as will be readily apparent to those skilled in the art. Such changes and modifications are within the scope and teaching of this invention as defined by the claims appended hereto.

What is claimed is:

1. In an image counter having means for driving a film having image means thereon in a forward and reverse direction past a sensing means, said image means being defined from other areas of the film by the amount of light that passes therethrough, an automatic control system comprising at least two light sensing means located on one side of the film, one such light sensing means located at least in part ahead of the other relative to the direction of film travel, means for directing light toward the sensing means from the side of the film opposite the light sensing means such that the amount of light impinging on a sensing means varies as the various areas of the film pass between the light directing means and said light sensing means, whereby at least a portion of one of the light sensing means receives a change in the amount of light before any portion of the other light sensing means as each of the image means on the film moves past in either direction, an electrical circuit means, means associated with the electrical circuit means for generating a first electrical signal responsive to the change of light impinging on one of the sensing means, and for generating a second electrical signal in response to the change of light impinging on the other sensing means said first signal being out-of-time phase with said second signal in proportion to the distance the one sensing means is located ahead of the other relative to the direction of film travel, means responsive to a first signal relationship at one instant of time of the out-of-time phase signals for determining the direction of count corresponding to the direction of film travel, means responsive to a second signal relationship at another instant of time of the out-of-time phase signals for counting each image means as it moves past in the determined direction, and means responsive to said first and second electrical signals for stopping the film on a selected image.

2. In an image counter of claim 1, said automatic control system further comprising means for generating electrical signals defining an image representing an initial condition, means for generating electrical signals defining a selected image, means responsive to said last named signals for driving the film in a direction from its initial condition to the selected image, and means responsive to said first and second signals for stopping the film on the selected image.

3. In an image counter of claim 2, said automatic control system further comprising a counter means, means for preloading the counter means in response to said signals representing an initial image count for generating signals at the output of the counter means representing said initial count, means in response to said signal relationships of said out-of-time phase signals for updating the signals at the output of the counter means to represent the count of each image as it moves past the sensing means, comparing means for comparing the counts represented by the signals from the counter means and the signals representing said selected image and for generating output signals when these count signals compare in predetermined correspondence, and means in response to the comparing means output signals for driving the film in a direction towards the selected image and stopping the film on that image.

4. In an image counter of claim 3, said automatic control system further comprising means for driving the film at a first speed when the difference in magnitude between the count at the output of the counter means and the selected count is greater by a given number, and means for driving the film at a second speed when the difference in magnitude between the count at the output of the counter means and the selected count is less than the given number.

5. In an image counter of claim 4 wherein said second speed is lower than said first speed.

6. In an image counter of claim 1, wherein the means for stopping the film on the selected image further comprises means for stopping the film in a first position with said sensing means between the selected image and an adjacent image, and means for driving the film to a final position with at least one sensing means behind the selected image.

7. In an image counter of claim 6, wherein the speed at which the film is driven to the first position is greater than the speed at which the film is driven from the first position to the final position.

8. In an image counter of claim 3, said automatic control system further comprising means for driving the film at a first speed when the difference in magnitude between the count at the output of the counter means and the selected count is greater by a given number, means for driving the film at a second speed when the difference in magnitude between the count at the output of the counter means and the selected count is less than said given number, means for driving the film at said second speed to a first position with both of said sensing means between the selected image and an adjacent image, and means for driving the film at a third speed from said first position to a final position with at least one of said sensing means behind said selected image, said first speed being greater than said second speed and said second speed being greater than said third speed.

9. In an image counter of claim 1, said automatic control system further comprising means for latching the driving means in a stopped condition upon stopping on the selected image.

10. In an image counter of claim 8, said automatic control system further comprising means for latching the driving means in a stopped condition when said final position is obtained.

11. In an image counter of claim 6, said automatic control system further comprising means for stopping the film at said final position always in response to the same edge of the selected image.

12. In an image counter of claim 6, said automatic control system further comprising means for driving the film from said first position to said final position always in the same direction.

13. In an image counter of claim 12, said automatic control system further comprising means for driving the film from said first position to said final position always in a count down direction.

14. In an image counter of claim 2, said automatic control system further comprising means in response to said signals representing a selected image count for generating a display of said count.

15. The image counter of claim 1 wherein the spacing between said light sensing means is less than the length of the image means measured in the direction of film travel.

16. The image counter of claim 1 wherein each of said first and second signals has a leading edge and a trailing edge, the leading and trailing edges of said first signal occurring in time before the leading and trailing edges, respectively, of said second signal when the film travels in one direction, and the leading and trailing edges of said second signal appearing in time before the leading and trailing edges, respectively, of said first signal when the film travels in the opposite direction, means for generating a signal determining the direction of count in one direction at the instant of time that the leading edge of said first signal occurs and prior to the time the leading edge of said second signal occurs and for generating a signal determining the direction of count in the opposite direction at the instant of time when the leading edge of said second signal occurs and before the leading edge of said first signal occurs, and means for counting each image means in the one direction when the trailing edge of said second signal occurs and after the trailing edge of said first signal occurs and for counting each image means in the opposite direction when the trailing edge of said first signal occurs and after the trailing edge of said second signal occurs.

17. The image counter of claim 3 wherein the spacing between said light sensing means is less than the length of the image means measured in the direction of film travel.

18. In an image counter having means for driving a film having image means thereon in a forward and reverse direction past a sensing means, said image means being defined from other areas of the film by the amount of light that passes therethrough, an automatic control system comprising at least two light sensing means located on one side of the film, one such light sensing means being located at least in part ahead of the other relative to the direction of film travel, means for directing light toward the sensing means from the side of the film opposite the light sensing means such that the amount of light impinging on a sensing means varies as the various areas of the film pass between the light directing means and said light sensing means, whereby at least a portion of one of th light sensing means receives a change in the amount of light before any portion of the other light sensing means as each of the image means on the film moves past in either direction, means for generating a first electrical signal responsive to the change in light impinging on one of the sensing means and for generating a second electrical signal in response to the change in light impinging on the other sensing means, the spacing between the light sensing means being less than the length of the image means measured in the direction of film travel, whereby as an image means moves in one direction between the light directing means and the light detecting means only said first signal is present, then both are present, and then only said second signal is present, and as an image means moves in the opposite direction between the light directing means and the light sensing means only said second signal is present, then both are present, then only said first signal is present, said first and second signals being out-of-time phase as the film moves past in either direction, means responsive to a first signal relationship at one instant of time of the out-of-time phase signals for determining the direction of count corresponding to the direction of film travel, means responsive to a second signal relationship at another instant of time of the out-of-time phase signals for counting each image means as it moves past, means for generating electrical signals defining an image representing an initial condition, means for generating electrical signals defining a selected image, a counter means, means for preloading the counter means in response to said signals representing an initial image count for generating signals at the output of the counter means representing said initial count, means responsive to said signal relationships of said out-of-time signals for updating the signals at theoutput of the couner means to represent the count of the image means as it moves past the sensing means, comparing means for comparing the counts represented by the signals from the counter means and the signals representing said selected image and for generating output signals when these count signals compare in predetermined correspondence, and means in response to the comparing means output signals for driving the film in a direction toward the selected image and stopping the film on that image.

* * * * *